US011475881B2

United States Patent
Mandal et al.

(10) Patent No.: US 11,475,881 B2
(45) Date of Patent: Oct. 18, 2022

(54) DEEP MULTI-CHANNEL ACOUSTIC MODELING

(71) Applicant: Amazon Technologies, Inc., Seattle, WA (US)

(72) Inventors: Arindam Mandal, Redwood City, CA (US); Kenichi Kumatani, San Jose, CA (US); Nikko Strom, Kirkland, WA (US); Minhua Wu, San Jose, CA (US); Shiva Sundaram, Fremont, CA (US); Bjorn Hoffmeister, Seattle, WA (US); Jeremie Lecomte, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 16/932,049

(22) Filed: Jul. 17, 2020

(65) Prior Publication Data

US 2020/0349928 A1 Nov. 5, 2020

Related U.S. Application Data

(63) Continuation of application No. 16/143,910, filed on Sep. 27, 2018, now Pat. No. 10,726,830.

(51) Int. Cl.
*G10L 15/16* (2006.01)
*G10L 15/22* (2006.01)
(Continued)

(52) U.S. Cl.
CPC ................ *G10L 15/16* (2013.01); *G06N 3/08* (2013.01); *G10L 15/063* (2013.01); *G10L 15/22* (2013.01);
(Continued)

(58) Field of Classification Search
CPC ....... G10L 15/16; G10L 15/063; G10L 15/22; G10L 15/30; G06N 3/08; H04R 1/406
See application file for complete search history.

(56) References Cited

U.S. PATENT DOCUMENTS 9,972,339 B1 * 5/2018 Sundaram .............. G10L 25/78
2013/0185070 A1 * 7/2013 Huo ...................... G10L 15/063
704/243

(Continued)

*Primary Examiner* — Paras D Shah
(74) *Attorney, Agent, or Firm* — Pierce Atwood LLP

(57) ABSTRACT

Techniques for speech processing using a deep neural network (DNN) based acoustic model front-end are described. A new modeling approach directly models multi-channel audio data received from a microphone array using a first model (e.g., multi-channel DNN) that takes in raw signals and produces a first feature vector that may be used similarly to beamformed features generated by an acoustic beamformer. A second model (e.g., feature extraction DNN) processes the first feature vector and transforms it to a second feature vector having a lower dimensional representation. A third model (e.g., classification DNN) processes the second feature vector to perform acoustic unit classification and generate text data. These three models may be jointly optimized for speech processing (as opposed to individually optimized for signal enhancement), enabling improved performance despite a reduction in microphones and a reduction in bandwidth consumption during real-time processing.

20 Claims, 16 Drawing Sheets

(51) Int. Cl.

| | |
|---|---|
| ***G06N 3/08*** | (2006.01) |
| ***G10L 15/06*** | (2013.01) |
| ***G10L 15/30*** | (2013.01) |
| ***H04R 3/00*** | (2006.01) |
| ***H04R 1/40*** | (2006.01) |

(52) U.S. Cl.

CPC .............. *G10L 15/30* (2013.01); *H04R 1/406* (2013.01); *H04R 3/005* (2013.01)

(56) References Cited

U.S. PATENT DOCUMENTS

| | | | | |
|---|---|---|---|---|
| 2017/0178664 | A1* | 6/2017 | Wingate | G10L 25/30 |
| 2018/0068675 | A1* | 3/2018 | Variani | G10L 19/008 |
| 2018/0350351 | A1* | 12/2018 | Kopys | G10L 15/02 |
| 2019/0043491 | A1* | 2/2019 | Kupryjanow | G10L 15/16 |
| 2019/0156837 | A1* | 5/2019 | Park | G06N 3/0454 |
| 2019/0172476 | A1* | 6/2019 | Wung | G10L 21/0364 |

* cited by examiner

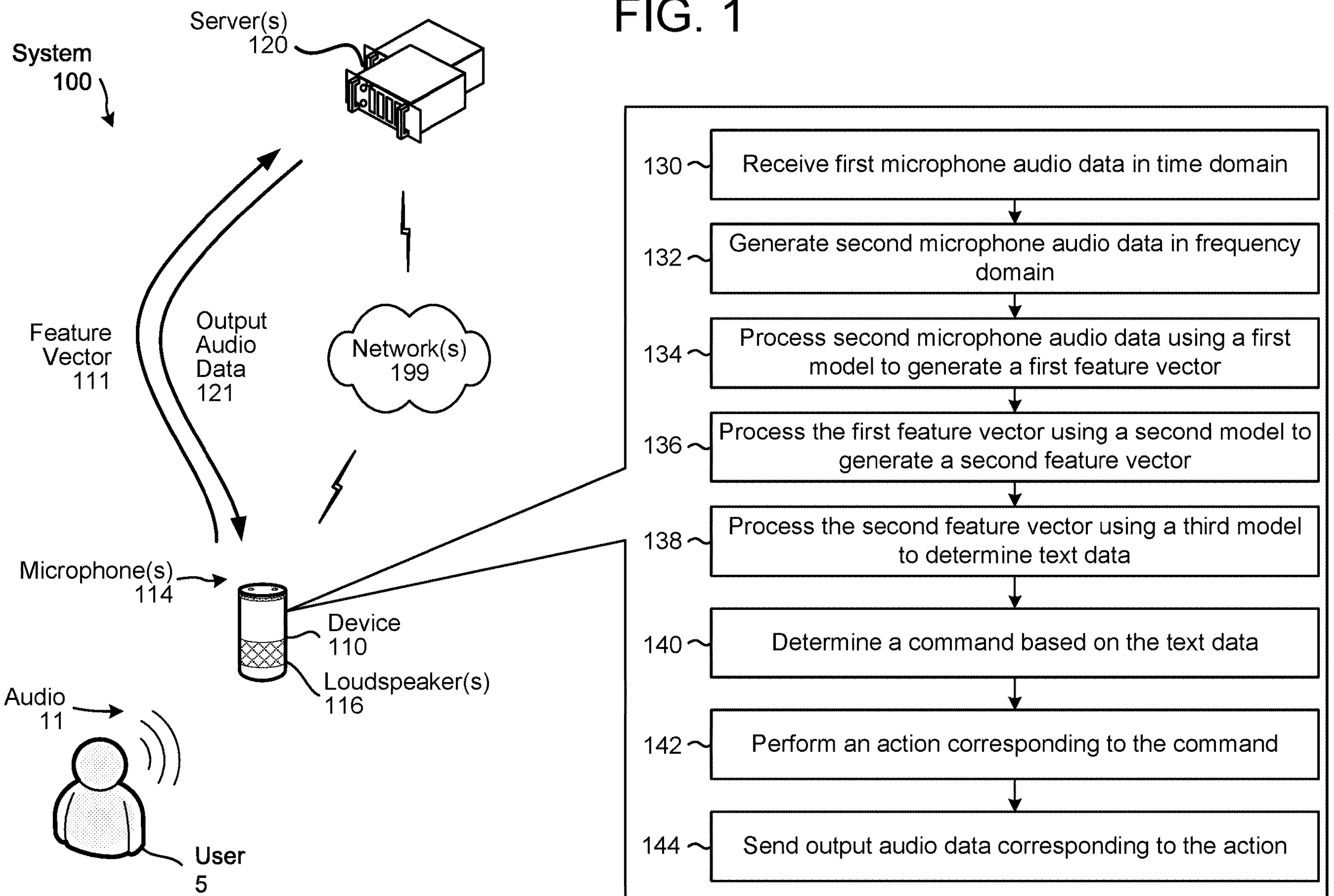
FIG. 1
System 100
Server(s) 120
Network(s) 199
Feature Vector 111
Output Audio Data 121
Microphone(s) 114
Device 110
Loudspeaker(s) 116
Audio 11
User 5
130 Receive first microphone audio data in time domain
132 Generate second microphone audio data in frequency domain
134 Process second microphone audio data using a first model to generate a first feature vector
136 Process the first feature vector using a second model to generate a second feature vector
138 Process the second feature vector using a third model to determine text data
140 Determine a command based on the text data
142 Perform an action corresponding to the command
144 Send output audio data corresponding to the action NLU Storage 373
374b
374n
374a
Speechlet 1 Intents
376n
376b
Speechlet 2
Speechlet 1 Grammar
376a
Entity Library 382
384n
384c
384b
384a
386an
386ab
386aa
Gazetteer C
Gazetteer B
Gazetteer A
Speechlet 1 Lexicon
Knowledge Base(s) 372
NLU 260
Recognizer 363
NER 362
IC 364
Server(s) 120

NLU 260
Text data 410
Speechlet C Recognizer 363-C
Speechlet B Recognizer 363-B
Speechlet A Recognizer 363-A
NER 362-A
IC 364-A
Cross-speechlet N-best list data 440
Pruning 450
Light Slot Filler 452
Cross-speechlet N-best list data 460
Entity Resolution 470
Ranker 490
Other data 491
Orchestrator 230
First NLU Results Data
Data
485a
485b
485n Device
Location
Session ID
Session Processes
Echo
kitchen
12345
<command: what is the weather>, <source: weather API>
Mic Array
upstairs
11234
<command: play Adele>, <source: music API>
TV
office
11123
<command: play animal house>, <source: movie API>
...
Dot
living room
11112
<command: buy candles>, <source: shopping API>
502
Profile Storage
270
Network(s)
199

Energy Chart 810
Microphone Audio Data 812
Spectrogram 830
Frequency
Time
Feature Vector 832
Row 834
Microphone Audio Data x(n) 812
FFT 820
Microphone Audio Data X(m,n) 822

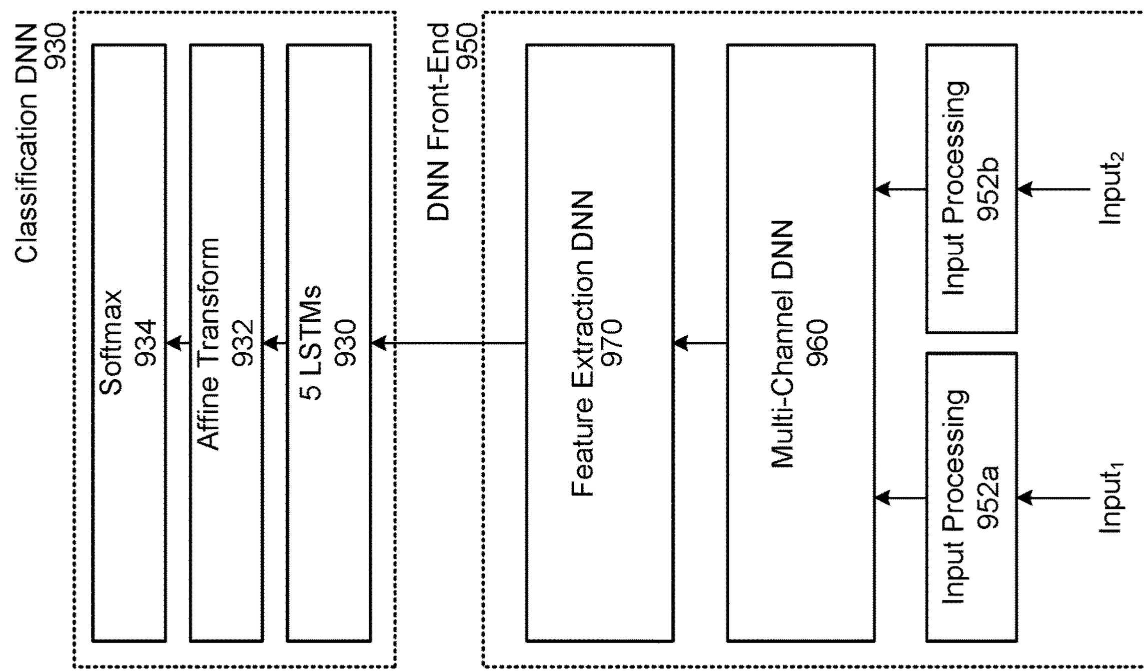
FIG. 9
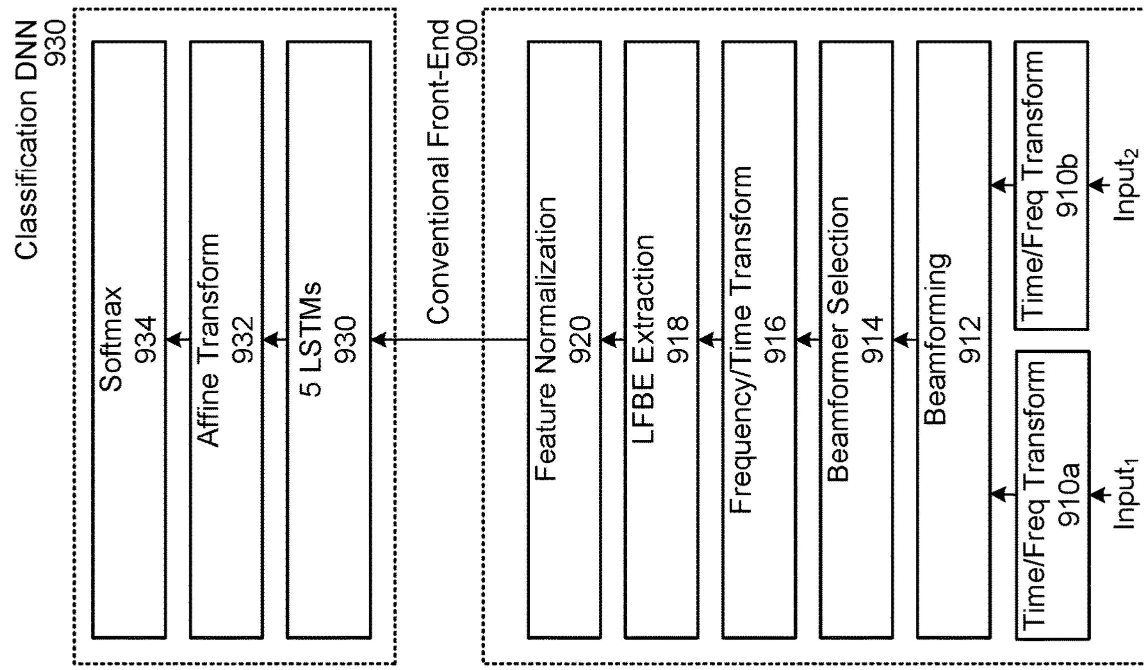

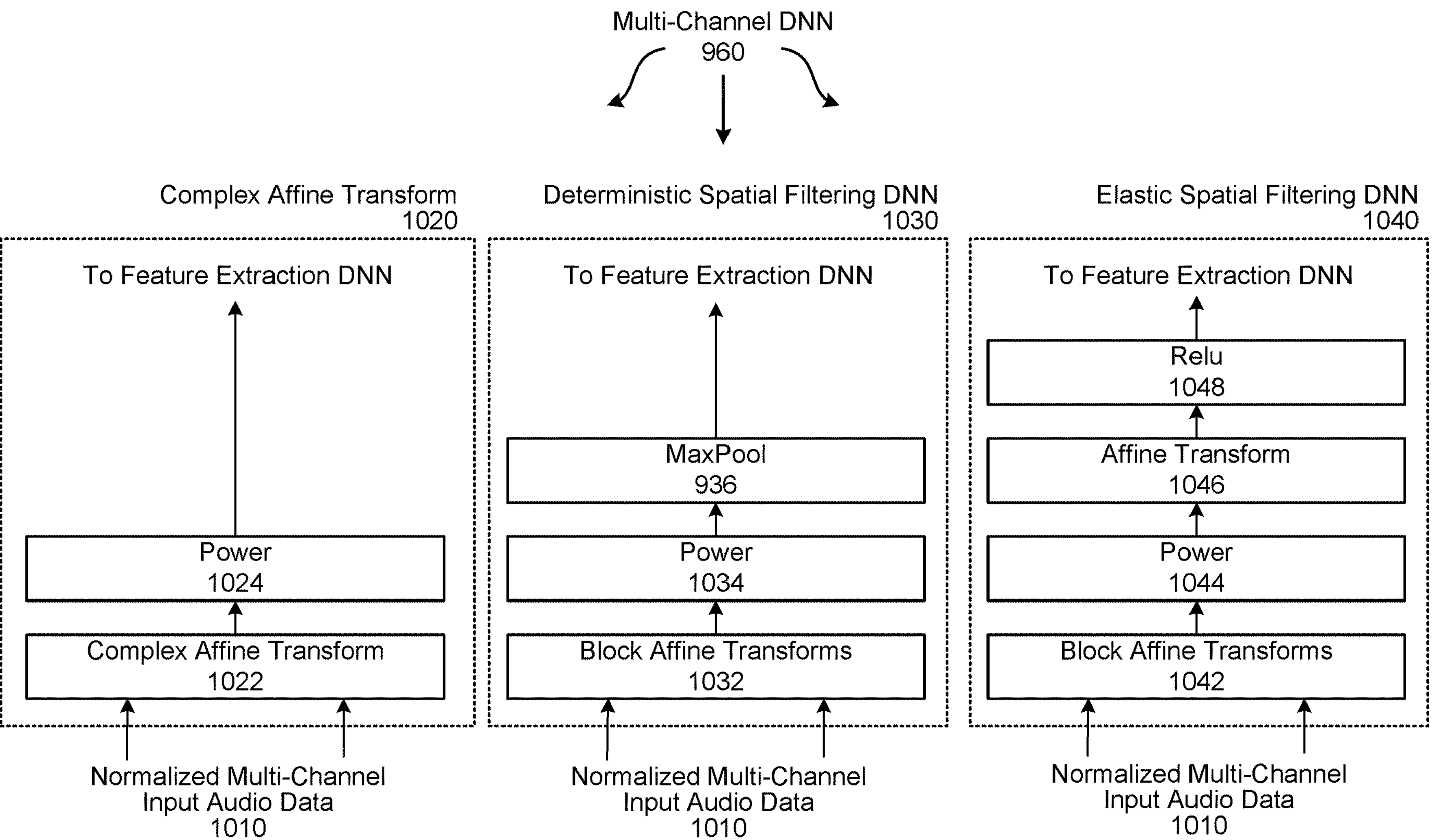
FIG. 10
Multi-Channel DNN
960
Complex Affine Transform
1020
To Feature Extraction DNN
Power
1024
Complex Affine Transform
1022
Normalized Multi-Channel
Input Audio Data
1010
Deterministic Spatial Filtering DNN
1030
To Feature Extraction DNN
MaxPool
936
Power
1034
Block Affine Transforms
1032
Normalized Multi-Channel
Input Audio Data
1010
Elastic Spatial Filtering DNN
1040
To Feature Extraction DNN
Relu
1048
Affine Transform
1046
Power
1044
Block Affine Transforms
1042
Normalized Multi-Channel
Input Audio Data
1010

Conventional Upload 1300
Real-Time Upload
Server(s) 120
Device 110
Audio Data
Comprehensive Upload 1310
Real-Time Upload
Feature Vector
Audio Data
Vector-Only Upload 1330
Delayed Upload 1320
Real-Time Upload
Background Upload
Real-Time Upload
Server(s) 120
Device 110
Feature Vector
Audio Data
Feature Vector Network(s) 199
Device 110
Antenna 1414
Microphone(s) 114
Loudspeaker(s) 116
Display 1416
Camera 1418
I/O Device Interfaces 1402
Controller(s) / Processor(s) 1404
Memory 1406
Storage 1408
Bus 1424

DEEP MULTI-CHANNEL ACOUSTIC MODELING

CROSS-REFERENCE TO RELATED APPLICATION

This application is a continuation of, and claims priority to, U.S. patent application Ser. No. 16/143,910, entitled "DEEP MULTI-CHANNEL ACOUSTIC MODELING," filed on Sep. 27, 2018, in the names of Arindam Mandal and scheduled to issue on Jul. 28, 2020 as U.S. Pat. No. 10,726,830. The above application is hereby incorporated by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of computing devices to perform tasks based on the user's spoken commands. The combination of speech recognition processing and natural language understanding processing techniques is referred to herein as speech processing. Speech processing may also involve converting a user's speech into text data which may then be provided to skills or software configured to execute specific functionality based on the user's spoken commands.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to perform speech processing using a deep neural network (DNN) based acoustic model front-end according to embodiments of the present disclosure.

FIG. 9 is a conceptual diagram illustrating components of a conventional audio front-end as well as components of a front-end deep neural network (DNN) according to embodiments of the present disclosure.

FIG. 10 is a conceptual diagram of components of multi-channel DNNs according to embodiments of the present disclosure.

DETAILED DESCRIPTION

Figure 2:
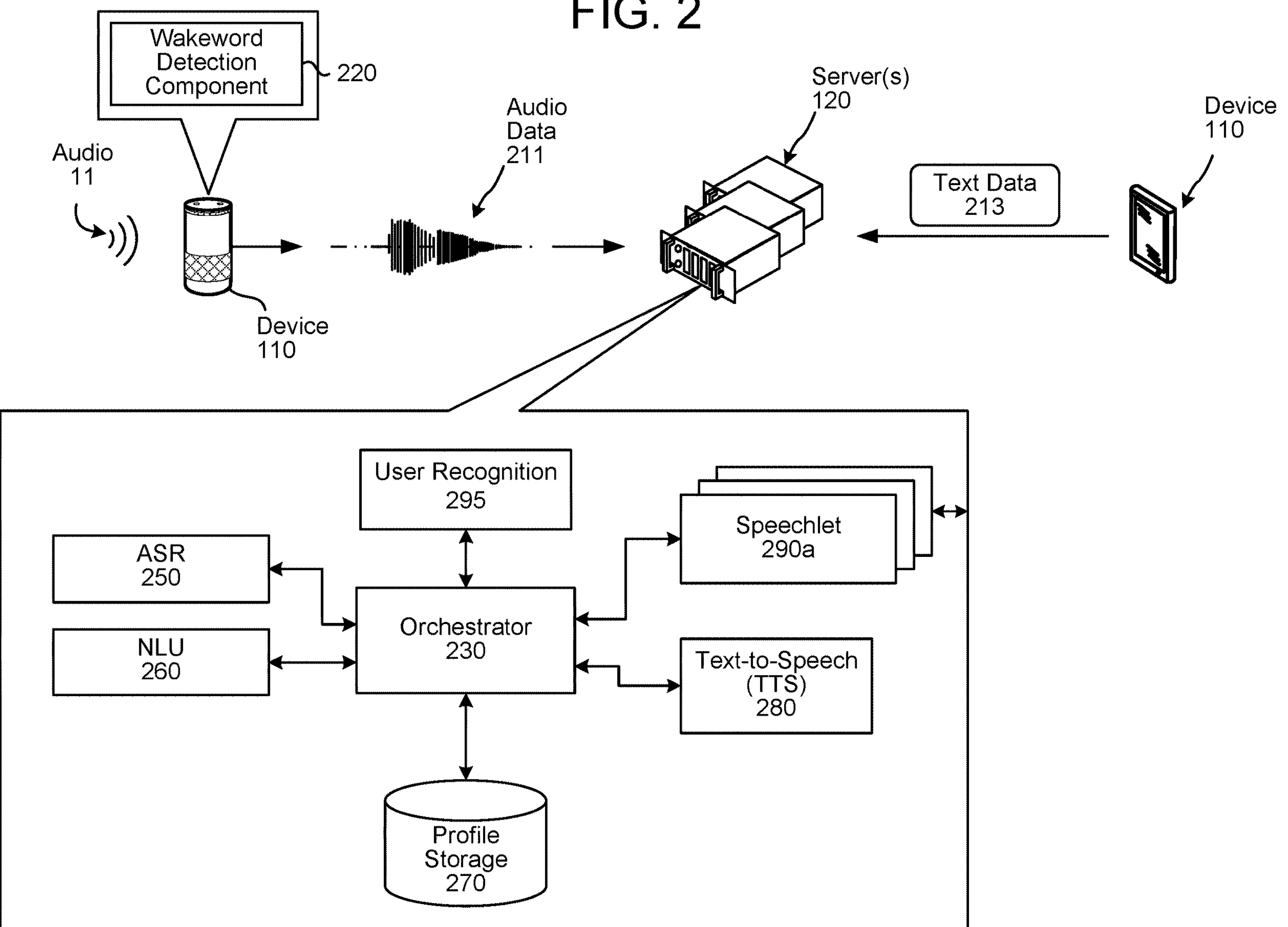
FIG. 2 is a conceptual diagram of components of a system according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

In a conventional system, a local device may process input audio data captured by a microphone array to separate the input audio data into individual signals that correspond to a plurality of directions, with each signal corresponding to a particular direction. This may be referred to as "beamforming" (e.g., microphone array processing) and is just one technique for audio signal processing. Beamforming improves speech processing by isolating audio data generated in a specific direction. After beamforming, the local device may select a single audio signal (e.g., beamformed audio data) with the highest energy to upload to remote server(s) for further processing. The remote server(s) may receive the beamformed audio data and perform feature extraction, such as log-mel filter bank energy (LFBE) feature extraction, to generate a feature vector. A conventional audio front-end comprises both beamforming and feature extraction, although the local device typically performs beamforming and the remote server(s) typically perform feature extraction.

The remote server(s) may then perform acoustic unit classification on the feature vector using a classification deep neural network (DNN) to detect distinct short sounds (e.g., predict ASR senon or phoneme targets, sometimes referred to as acoustic modeling). The results from the acoustic modeling may be used in a language modeling operation to ultimately generate output text, which may be used for NLU processing. ASR operations may include both acoustic modeling and language modeling. Thus, a conventional far-field speech recognition system (e.g., distant speech recognition system) consists of distinct components for beamforming, feature extraction and acoustic unit classification/acoustic modeling. These distinct components are typically optimized individually for specific component-specific purposes, such as signal enhancement (e.g., audio signal sounds clearer due to less noise).

To improve speech processing, systems and methods are disclosed that include a DNN-based acoustic model front-end that mimics beamforming and feature extraction in a data-driven manner. Thus, a conventional audio front-end may be replaced with a new modeling approach where multi-channel audio data from a microphone array is directly modeled in the DNN-based acoustic model front-end before being sent to a remote server. For example, the beamforming may be performed using a first processing block (e.g., multi-channel DNN) that takes in raw signals collected from multiple microphones and produces a compact representation (e.g., first feature vector) that may be used similarly to beamformed features generated by an acoustic beamformer. Similarly, feature extraction may be performed using a second processing block (e.g., feature extraction DNN) that takes the output (e.g., first feature vector) from the first processing block and transforms it to a lower dimensional representation (e.g., second feature vector). The second feature vector is then sent to a third processing block (e.g., classification DNN) that performs acoustic unit classification, similar to the conventional system.

By replacing the conventional audio front-end with a DNN-based acoustic model front-end, components of the far-field speech recognition system may be jointly optimized for ASR processing (as opposed to individually optimized for signal enhancement). For example, the first processing block (e.g., multi-channel DNN), the second processing block (e.g., feature extraction DNN) and the third processing block (e.g., classification DNN) may be jointly optimized by optimizing each processing block in a stage-wise or other manner. Additionally or alternatively, components of the far-field speech recognition system may be optimized to capture speech even if this results in more noise.

Another benefit of using the DNN-based acoustic model front-end is that the system may be able to obtain desired system performance even if there is a reduction in a number of microphones, as performance using the techniques herein may be similar using two microphones for audio capture as it is using four or more microphones. Additionally, a bandwidth requirement may be reduced during real time processing as the local device only needs to upload low dimensional feature vectors (e.g., a second feature vector) for speech processing by the server(s) rather than sending more bandwidth intensive raw audio data (or other data). In some examples, the raw audio data may be uploaded at a later point in time (for example for system correction and/or retraining), although the device may either upload or not upload the audio data without departing from the disclosure.

FIG. 1 illustrates a system configured to perform speech processing using a deep neural network (DNN) based acoustic model front-end according to embodiments of the present disclosure. Although the figures and discussion of the present disclosure illustrate certain operational steps of the system in a particular order, the steps described may be performed in a different order (as well as certain steps removed or added) without departing from the intent of the disclosure. A plurality of devices may communicate across one or more network(s) 199. For example, FIG. 1 illustrates an example of a device 110 (e.g., a speech-controlled device) local to a user 5 communicating with server(s) 120 via the network(s) 199.

The server(s) 120 may be configured to process voice commands (e.g., voice inputs) received from the device 110. For example, the device 110 may capture input audio 11 corresponding to a voice command from the user 5 (e.g., an utterance), may generate input audio data representing the audio 11, and may process the input audio data to generate a feature vector 111. For example, the device 110 may determine a number of values, called features, representing the qualities of the audio data, along with a set/data structure of those values, called a feature vector feature vector (e.g., feature vector data, vector data, etc.), representing the features/qualities of the audio data within the frame for a particular frequency band. Many different features may be determined, as known in the art, and each feature represents some quality of the audio that may be useful for speech processing. A number of approaches may be used by the device 110 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. A feature vector specifically corresponding to audio data may be referred to as an audio feature vector.

Whereas conventional techniques send the input audio data to the server(s) 120 for speech processing, the device may send the feature vector 111 to the server(s) 120 for speech processing and may upload audio data at a later point in time. The server(s) 120 may receive the feature vector 111, may identify the voice command represented in the feature vector 111, may determine one or more action(s) to perform, may perform at least some of the one or more action(s), and/or may send a command to the device 110 to perform at least some of the one or more action(s). Thus, the server(s) 120 may identify the voice command and may perform action(s) and/or send a command to the device 110 to perform action(s) corresponding to the voice command.

FIG. 1 illustrates the server(s) 120 processing a voice command when an utterance is received from a device 110. For example, the server(s) 120 may generate NLU intent data based on the feature vector 111 and may perform one or more action(s) based on the NLU intent data. The server(s) 120 may process the feature vector 111 and generate output audio data 121 as a response to the user 5. For example, the feature vector 111 may correspond to a voice command to stream music (e.g., "Alexa, please play electronic dance music") and the output audio data 121 may correspond to confirmation that the voice command was received (e.g., "Here is a playlist of electronic dance music.") or other responsive data.

As illustrated in FIG. 1, the system 100 may receive (130) first microphone audio data in a time domain. For example, the microphone(s) 114 may capture the audio 11 and generate the first microphone audio data. The system 100 may then generate (132) second microphone audio data in a frequency domain, such as by performing Fast Fourier Transform (FFT) processing or the like. The system 100 may process (134) the second microphone audio data using a first model (e.g., multi-channel deep neural network (DNN)) to generate a first feature vector, may process (136) the first feature vector using a second model (e.g., feature extraction DNN) to generate a second feature vector, and may process (138) the second feature vector using a third model (e.g., classification DNN) to determine text data. For example, the text data may correspond to the utterance represented by the input audio data.

The system 100 may determine (140) a command based on the text data, may perform (142) an action corresponding to the command and may send (144) output audio data corresponding to the action to the device 110. While not illustrated in FIG. 1, in some examples the server(s) 120 may also send an instruction to perform the action to the device 110 without departing from the disclosure.

As will be discussed in greater detail below, the first model (e.g., multi-channel DNN) takes raw signals collected from multiple microphones and produces a compact representation (e.g., first feature vector) that may be used similarly to beamformed features generated by beamforming in using conventional techniques. For example, the first model may perform spatial filtering to separate the input audio data into a plurality of directions, determine an amount of energy in individual frequency bands for each of the plurality of directions, and determine an amount of power in one or more of the plurality of directions, as described in greater detail below with regard to FIG. 10.

The output of the first model (e.g., first feature vector) may be input to the second model (feature extraction DNN), which transforms this output to a lower dimensional representation (e.g., second feature vector). For example, the second model may convert the first feature vector to a Mel-scale using a Mel filter bank or some form of matrix transformation (e.g., affine matrix weighted to convert to the Mel-scale) to combine multiple frequency bands based on the Mel-scale. The Mel-scale aims to mimic the non-linear human ear perception of sound, by being more discriminative at lower frequencies and less discriminative at higher frequencies. Thus, the second feature vector may indicate a magnitude of energy in individual frequency bands of the beamformed audio data, where the frequency bands are non-uniform and based on the Mel-scale.

The output of the second model is input to the third model (e.g., classification DNN), which may detect distinct short sounds (e.g., predict ASR senon or phoneme targets) and ultimately generate the text data for NLU processing. Thus, the third model is trained using data in the form of the second feature vector in order to classify senons, as discussed in greater detail below.

As used herein, the output of the first model may be referred to as a first feature vector (e.g., first feature vector data) and an output of the second model may be referred to as a second feature vector (e.g., second feature vector data). One of skill in the art may recognize that the first feature vector may be different than the second feature vector in one or more ways without departing from the disclosure. For example, the first feature vector may represent first qualities of the input audio data and may include a first number of features (e.g., values) and/or correspond to a first number of frequency ranges (e.g., frequency bands), whereas the second feature vector may represent second qualities of the input audio data and may include a second number of features and/or correspond to a second number of frequency ranges. However, the output of both the first model and the second model may be referred to as feature vectors (e.g., feature vector data) without departing from the disclosure.

In some examples, the device 110 may process the microphone audio data using the first model and the second model to generate the second feature vector. After generating the second feature vector, the device 110 may send the second feature vector to the server(s) 120 to perform acoustic unit classification using the third model. However, the disclosure is not limited thereto and the device 110 and/or the server(s) 120 may process the microphone audio data using the first model and/or the second model without departing from the disclosure. For example, the device 110 may send the first feature vector to the server(s) 120 and the server(s) 120 may generate the second feature vector without departing from the disclosure.

By replacing the conventional audio front-end with a DNN-based acoustic model front-end, the system 100 (e.g., far-field speech recognition system) may be jointly optimized for ASR processing (as opposed to individually optimized for signal enhancement). For example, the first model (e.g., multi-channel DNN), the second model (e.g., feature extraction DNN) and the third model (e.g., classification DNN) may be jointly optimized by optimizing each model in a stage-wise manner.

To illustrate a first example, $1^{st}$-stage input test data may be input to the first model to generate first raw output data, which may be compared to $1^{st}$-stage output test data to determine a first error signal. The system 100 may optimize the first model to minimize the first error signal, resulting in the first model generating first optimized output data. The first optimized output data may be input to the second model to generate second raw output data, which may be compared to $2^{nd}$-stage output test data to determine a second error signal. The system 100 may optimize the second model to minimize the second error signal, resulting in the second model generating second optimized output data. Finally, the second optimized output data may be input to the third model to generate third raw output data, which may be compared to $3^{rd}$-stage output test data to determine a third error signal. The system 100 may optimize the third model to minimize the third error signal, resulting in the third model generating third optimized output data.

To illustrate a second example, $3^{rd}$-stage input test data may be input to the third model to generate first $3^{rd}$-stage raw output data, which may be compared to first $3^{rd}$-stage output test data to determine a first error signal. The system 100 may optimize the third model to minimize the first error signal, resulting in the third model generating first $3^{rd}$-stage optimized output data. After optimizing the third model, $2^{nd}$-stage input test data may be input to the second model to generate first $2^{nd}$-stage raw output data. The system 100 may input the first $2^{nd}$-stage raw output data to the third model to generate second $3^{rd}$-stage raw output data, which may be compared to second $3^{rd}$-stage output test data to determine a second error signal. The system 100 may optimize the second model to minimize the second error signal, resulting in the second model generating first $2^{nd}$-stage optimized output data and the third model generating second $3^{rd}$-stage optimized output data. After optimizing the second model, the system 100 may input $1^{st}$-stage input test data to the first model to generate $1^{st}$-stage raw output data. The system 100 may input the $1^{st}$-stage raw output data to the second model to generate second $2^{nd}$-stage raw output data, which may be input to the third model to generate third $3^{rd}$-stage raw output data. The system 100 may compare the third $3^{rd}$-stage raw output data to third $3^{rd}$-stage output test data to determine a third error signal. The system 100 may optimize the first model to minimize the first error signal, resulting in the first model generating $1^{st}$-stage optimized output data, the second model generating second $2^{nd}$-stage optimized output data, and the third model generating third $3^{rd}$-stage optimized output data.

The first example described above illustrates a first technique of training the models in a forward direction (e.g., $1^{st}$-$2^{nd}$-$3^{rd}$) which requires additional test data. For example, the first example requires intermediate test data (e.g., test data at the output of each model) in order to train the models effectively. In contrast, the second example illustrates a second technique of training the models in a backward direction (e.g., $3^{rd}$-$2^{nd}$-$1^{st}$), which does not require intermediate test data.

Instead, using the second technique, the system 100 may train the models using only $3^{rd}$-stage output test data (e.g., expected output of the third model). Additionally or alternatively, while the second example refers to three sets of test data (e.g., first $3^{rd}$-stage output test data, second 3rd-stage output test data, and third $3^{rd}$-stage output test data), the disclosure is not limited thereto and in some examples the system 100 may generate the first error signal, the second error signal, and the third error signal using only a single set of test data (e.g., third $3^{rd}$-stage output test data) without departing form the disclosure.

While the examples described above refer to the system 100 jointly optimizing the first model, the second model and the third model, the disclosure is not limited thereto. Instead, the system 100 may jointly optimize only the first model and the second model and/or only the second model and the third model without departing from the disclosure.

Additionally or alternatively, the system 100 may be optimized to capture speech (e.g., target phonemes), even if this results in more noise. Another benefit of using the DNN-based acoustic model front-end is a reduction in a number of microphones, as performance is similar using two microphones 114 as it is using four or more microphones 114. Additionally, a bandwidth requirement may be reduced during real time processing as the device 110 only needs to upload low dimensional feature vectors (e.g., a second feature vector) for speech processing by the server(s) 120 rather than sending more bandwidth intensive raw audio data (or other data). In some examples, the raw input audio data may be uploaded at a later point in time (for example for system correction and/or retraining), although the disclosure is not limited thereto and the device 110 may either upload or not upload the raw input audio data without departing from the disclosure.

The trained model and other models described herein, which are implemented by components of the system, may be trained and operated according to various machine-learning techniques. Such techniques may include, for example, neural networks (such as deep neural networks (DNNs) and/or recurrent neural networks (RNNs)), inference engines, and trained classifiers. Examples of trained classifiers include Support Vector Machines (SVMs), neural networks, decision trees, adaptive boosting (AdaBoost) combined with decision trees, and random forests. For example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

In some embodiments, the trained model is a deep neural network (DNN) that is trained using distributed batch stochastic gradient descent; batches of training data may be distributed to computation nodes where they are fed through the DNN in order to compute a gradient for that batch. The device 110 may update the DNN by computing a gradient by comparing audio data with a stored representation of a particular word and back-propagating error data based thereon. In some embodiments, the DNN includes additional forward pass targets that estimate synthetic gradient values and the device 110 updates the DNN by selecting one or more synthetic gradient values.

The system may operate using various components as described in FIG. 2. The various components may be located on same or different physical devices. Communication between various components may occur directly or across a network(s) 199.

An audio capture component(s), such as a microphone(s) 114 or an array of microphones of the device 110, captures audio 11. The device 110 processes audio data, representing the audio 11, to determine whether speech is detected. The device 110 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. This process may also be referred to as keyword detection, with a wakeword being a specific example of a keyword. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching conducted in the resulting lattices or confusion networks.

LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the server(s) 120. The audio data 211 may include data corresponding to the wakeword, or the portion of the audio data 211 corresponding to the wakeword may be removed by the device 110 prior to sending the audio data 211 to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system, as well as perform other operations.

The orchestrator component 230 sends the audio data 211 to an automatic speech recognition (ASR) component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to a natural language understanding (NLU) component 260, either directly or via the orchestrator component 230. The text data sent from the ASR component 250 to the NLU component 260 may include a top scoring hypothesis or may include an N-best list including multiple hypotheses. An N-best list may additionally include a respective score associated with each hypothesis represented therein. Each score may indicate a confidence of ASR processing performed to generate the hypothesis with which the score is associated.

Alternatively, the device 110 may send text data 213 to the server(s) 120. Upon receipt by the server(s) 120, the text data 213 may be sent to the orchestrator component 230. The orchestrator component 230 may send the text data 213 to the NLU component 260.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent representing an action that a user desires be performed as well as pieces of the input text data that allow a device (e.g., a device 110, the server(s) 120, etc.) to execute the intent. For example, if the text data corresponds to "call John," the NLU component 260 may determine an intent that the system establish a two-way communication channel between the device 110 originating the call and a device of the recipient "John."

The NLU component 260 outputs NLU results to the orchestrator component 230. The NLU results may include a representation of a single intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value. The orchestrator component 230 may send the NLU results to an associated speechlet component 290. If the NLU results include multiple NLU hypotheses, the orchestrator component 230 may send a portion of the NLU results corresponding to the top scoring NLU hypothesis to a speechlet component 290 associated with the top scoring NLU hypothesis.

A "speechlet" or "speechlet component" may be software running on the server(s) 120 that is akin to a software application running on a traditional computing device. That is, a speechlet component 290 may enable the server(s) 120 to execute specific functionality in order to perform one or more actions (e.g., provide information to a user, display content to a user, output music, or perform some other requested action). The server(s) 120 may be configured with more than one speechlet component 290. For example, a weather speechlet component may enable the server(s) 120 to provide weather information, a ride sharing speechlet component may enable the server(s) 120 to schedule a trip with respect to a ride sharing service, a restaurant speechlet component may enable the server(s) 120 to order a pizza with respect to a restaurant's online ordering system, a communications speechlet component may enable the system to perform messaging or multi-endpoint communications, a device-specific speechlet may enable the system to perform one or more actions specific to the device 110, etc. A speechlet component 290 may operate in conjunction between the server(s) 120 and other devices such as a device 110 local to a user in order to complete certain functions. Inputs to a speechlet component 290 may come from various interactions and input sources.

The functionality described herein as a speechlet or speechlet component may be referred to using many different terms, such as an action, bot, app, or the like.

A speechlet component 290 may include hardware, software, firmware, or the like that may be dedicated to the particular speechlet component 290 or shared among different speechlet components 290. A speechlet component 290 may be part of the server(s) 120 (as illustrated in FIG. 2) or may be located at whole (or in part) with one or more separate servers.

Unless expressly stated otherwise, reference to a speechlet, speechlet device, or speechlet component may include a speechlet component operating within the server(s) 120 (for example as speechlet component 290) and/or speechlet component operating within a server(s) separate from the server(s) 120.

A speechlet component 290 may be configured to perform one or more actions. An ability to perform such action(s) may sometimes be referred to as a "skill." That is, a skill may enable a speechlet component 290 to execute specific functionality in order to provide data or produce some other output requested by a user. A particular speechlet component 290 may be configured to execute more than one skill. For example, a weather skill may involve a weather speechlet component providing weather information to the server(s) 120, a ride sharing skill may involve a ride sharing speechlet component scheduling a trip with respect to a ride sharing service, an order pizza skill may involve a restaurant speechlet component ordering a pizza with respect to a restaurant's online ordering system, a windows control skill may involve a device-specific speechlet component causing a vehicle to move its windows, etc.

A speechlet component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, device-specific skills, as well as custom skills that are not associated with any pre-configured type of skill.

In some examples, the system may be configured with different device-specific speechlet components (illustrated as part of the speechlet components 290 in FIG. 2). A device-specific speechlet component may be specific to a vehicle manufacturer, an appliance manufacturer, or some other device manufacturer that does not control or maintain the server(s) 120.

A user profile may be configured with top-level speechlets. Thus, a user may invoke a top-level speechlet without explicitly referring to the speechlet in the user input. For example, a weather speechlet may be a top-level speechlet. A user may say "Alexa, what is the weather." In response, the system may call the weather speechlet to provide weather information, even though the user did not explicitly refer to the weather speechlet in the user input.

A user profile may also be configured with non-top-level speechlets. Thus, a user may need to explicitly refer to a non-top-level speechlet in a user input in order to cause the system to call the particular non-top-level speechlet to perform an action responsive to the user input. For example, the system may be configured with a top-level weather speechlet and a non-top-level Weather Underground speechlet. To cause the non-top-level Weather Underground speechlet to be called instead of the top-level weather speechlet, a user may need to explicitly refer to the non-top-level Weather Underground speechlet in the user input, for example by saying "Alexa, ask Weather Underground what is the weather for tomorrow."

In certain instances, the server(s) 120 may receive or determine text data responsive to a user input, when it may be more appropriate for audio to be output to a user. The server(s) 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The server(s) 120 may include profile storage 270. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be an umbrella profile specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a single group profile may additionally include preferences specific to the user associated therewith. That is, each user profile may include preferences unique from one or more other user profiles associated with the same group profile. A user profile may be a stand-alone profile or may be associated with a group profile.

A user profile may represent speechlet components enabled by the user associated with the user profile. The system may be configured such that certain speechlet components may not be invoked by a user's input unless the user has enabled the speechlet component. The system may automatically enable a device-specific speechlet component with respect to a user profile when the user associates a device, associated with the device-specific speechlet component, with the user's profile. For example, if the user associates a vehicle with their user profile, the system may enable the vehicle manufacturer's speechlet component without a particular user request to do so. The system may hide a device-specific speechlet component from a user until the user has associated a device (associated with the device-specific speechlet component) with their user profile. This is because device-specific speechlet components may be configured to only provide functionality useful to users having devices associated with the device-specific speechlet components. For example, a particular vehicle manufacturer's speechlet component may only provide functionality useful to a user having one or more of the vehicle manufacturer's vehicles.

When a user associates a device with their user profile, the user may provide the system with account information (e.g., account number, username, password, etc.). The server(s) 120 (or components thereof) may use the account information to communicate with a device server(s) associated with the vehicle. The server(s) 120 may be restricted from sending data to or receiving data from a device server(s) until the server(s) 120 authenticates itself with the device server(s) using the account information and/or a device identifier specific to the device newly associated with the user profile.

The profile storage 270, or a different storage, may store device profiles. Each device profile may be associated with a different device identifier. Each device profile may represent output capabilities (e.g., audio, video, quality of output, etc.) of the device. Each device profile may also represent a speechlet component identifier specific to a device-specific speechlet component associated with the device. For example, if the device 110 is a vehicle, the speechlet component identifier may represent a vehicle manufacturer speechlet component associated with the vehicle. For further example, if the device 110 is an appliance, the speechlet component identifier may represent an appliance manufacturer speechlet component associated with the appliance.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the component(s) of the system(s) and/or user are located.

The server(s) 120 may include a user recognition component 295 that recognizes one or more users associated with data input to the system. The user recognition component 295 may take as input the audio data 211, text data 213, and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.) received by the system in correlation with the present user input to stored biometric data of users. The user recognition component 295 may further perform user recognition by comparing image data (e.g., including a representation of at least a feature of a user) received by the system in correlation with the present user input with stored image data including representations of features of different users. The user recognition component 295 may perform additional user recognition processes, including those known in the art. Output of the user recognition component 295 may include a single user identifier corresponding to the most likely user that originated the present input. Alternatively, output of the user recognition component 295 may include an N-best list of user identifiers with respective scores indicating likelihoods of respective users originating the present input. The output of the user recognition component 295 may be used to inform NLU processing as well as processing performed by speechlet components 290.

Figure 3:
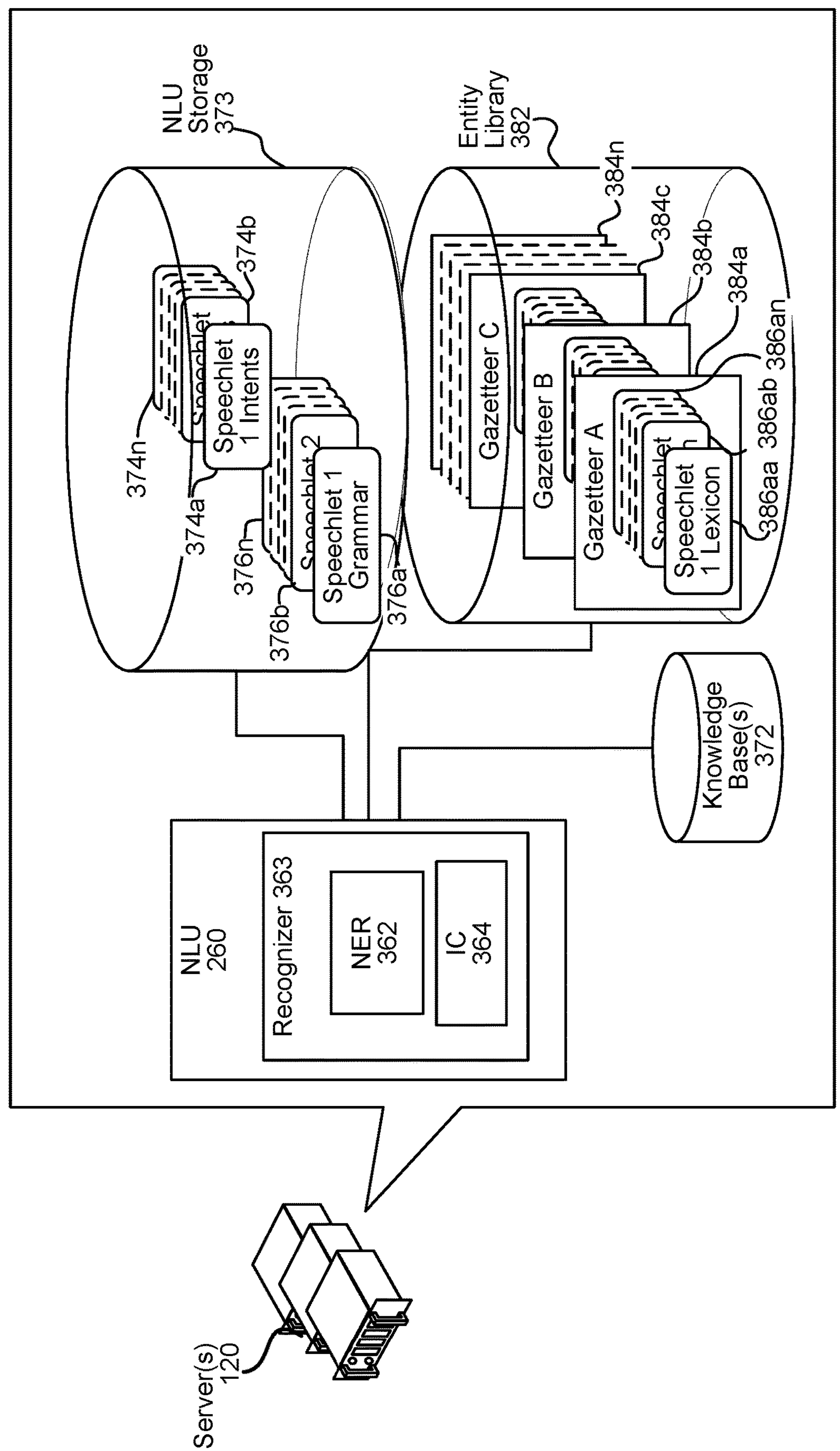
FIG. 3 is a conceptual diagram of how natural language understanding processing is performed according to embodiments of the present disclosure.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the server(s) 120, etc.) to complete that action. For example, if the NLU component 260 receives text data corresponding to "tell me the weather," the NLU component 260 may determine that the user intends the system to output weather information.

The NLU component 260 may process text data including several hypotheses. For example, if the ASR component 250 outputs text data including an N-best list of ASR hypotheses, the NLU component 260 may process the text data with respect to all (or a portion of) the ASR hypotheses represented therein. Even though the ASR component 250 may output an N-best list of ASR hypotheses, the NLU component 260 may be configured to only process with respect to the top scoring ASR hypothesis in the N-best list.

The NLU component 260 may annotate text data by parsing and/or tagging the text data. For example, for the text data "tell me the weather for Seattle," the NLU component 260 may tag "Seattle" as a location for the weather information.

The NLU component 260 may include one or more recognizers 363. Each recognizer 363 may be associated with a different speechlet component 290. Each recognizer 363 may process with respect to text data input to the NLU component 260. Each recognizer 363 may operate in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a speechlet component 290, associated with the recognizer 363 implementing the NER component 362. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include speechlet-indexed lexical information associated with a particular user and/or device 110. For example, a Gazetteer A (384*a*) includes speechlet-indexed lexical information 386*aa* to 386*an*. A user's music speechlet lexical information might include album titles, artist names, and song names, for example, whereas a user's contact list speechlet lexical information might include the names of contacts. Since every user's music collection and contact list is presumably different, this personalized information improves entity resolution.

An NER component 362 applies grammar models 376 and lexical information 386 associated with the speechlet component 290 (associated with the recognizer 363 implementing the NER component 362) to determine a mention of one or more entities in text data. In this manner, the NER component 362 identifies "slots" (corresponding to one or more particular words in text data) that may be needed for later processing. The NER component 362 may also label each slot with a type (e.g., noun, place, city, artist name, song name, etc.).

Each grammar model 376 includes the names of entities (i.e., nouns) commonly found in speech about the particular speechlet component 290 to which the grammar model 376 relates, whereas the lexical information 386 is personalized to the user and/or the device 110 from which the user input originated. For example, a grammar model 376 associated with a shopping speechlet component may include a database of words commonly used when people discuss shopping.

A downstream process called named entity resolution (discussed in detail elsewhere herein) actually links a portion of text data to an actual specific entity known to the system. To perform named entity resolution, the NLU component 260 may utilize gazetteer information (384*a*-384*n*) stored in an entity library storage 382. The gazetteer information 384 may be used to match text data with different entities, such as song titles, contact names, etc. Gazetteers 384 may be linked to users (e.g., a particular gazetteer may be associated with a specific user's music collection), may be linked to certain speechlet components 290 (e.g., a shopping speechlet component, a music speechlet component, a video speechlet component, a device-specific speechlet component, etc.), or may be organized in a variety of other ways.

Each recognizer 363 may also include an intent classification (IC) component 364. An IC component 364 parses text data to determine an intent(s), associated with the speechlet component 290 (associated with the recognizer 363 implementing the IC component 364), that potentially represents the user input. An intent represents to an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 374, associated with the speechlet component 290 that is associated with the recognizer 363 implementing the IC component 364.

The intents identifiable by a specific IC component 364 are linked to speechlet-specific (i.e., the speechlet component 290 associated with the recognizer 363 implementing the IC component 364) grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 (associated with the speechlet component 290 associated with the recognizer 363 implementing the NER component 362), attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music speechlet recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music speechlet, which an IC component 364 (also implemented by the music speechlet recognizer) may determine corresponds to a<PlayMusic> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a<PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words associated with the speechlet component 290 (in the knowledge base 372). For example, if the text data includes "play songs by the rolling stones," after failing to determine an album name or song name called "songs" by "the rolling stones," the NER component 362 may search the speechlet vocabulary for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {speechlet} Music, {intent}<PlayMusic>, {artist name} rolling stones, {media type} SONG, and {song title} mother's little helper. For further example, the NER component 362 may tag "play songs by the rolling stones" as: {speechlet} Music, {intent}<PlayMusic>, {artist name} rolling stones, and {media type} SONG.

Figure 4:
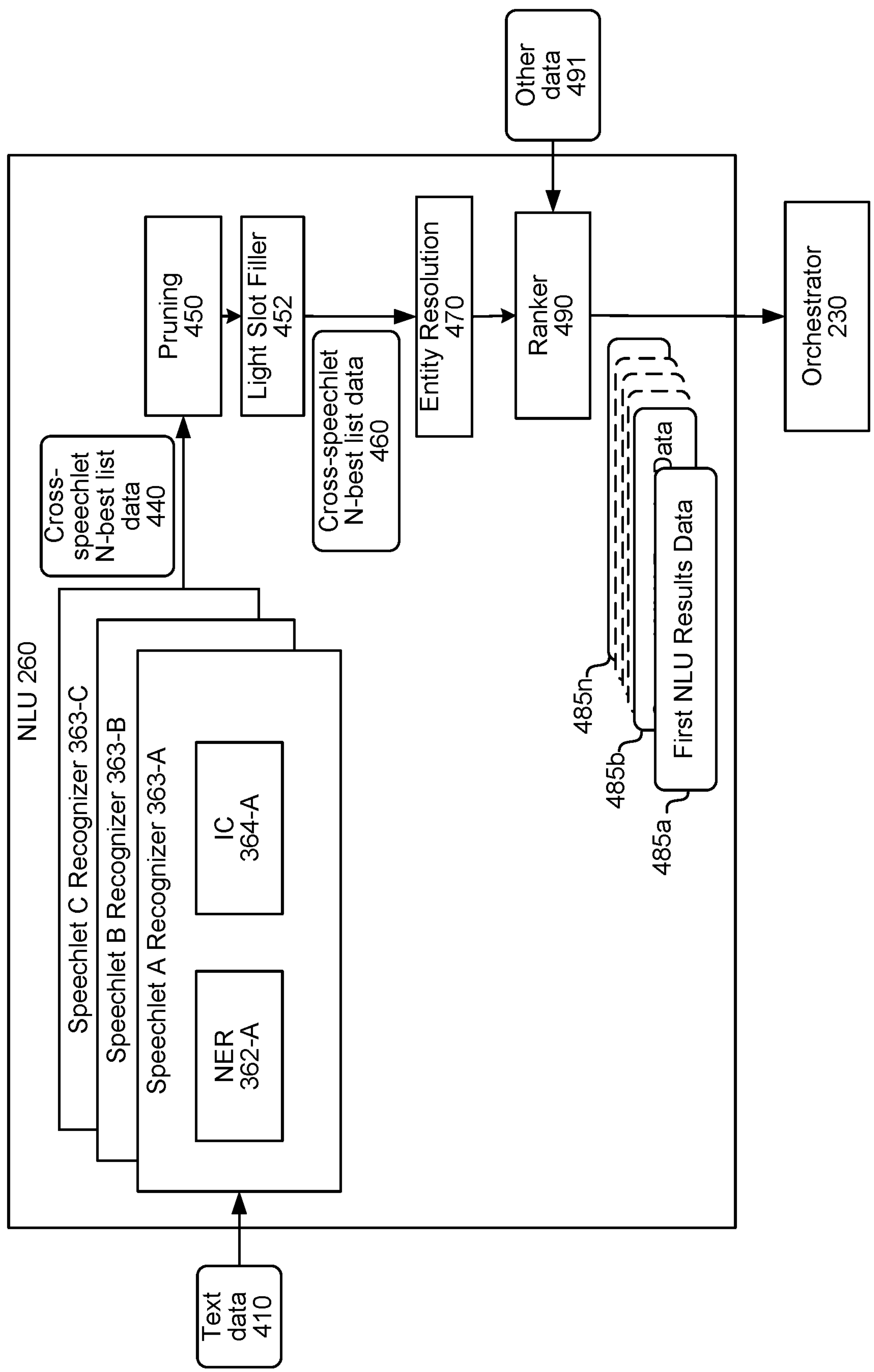
FIG. 4 is a conceptual diagram of how natural language understanding processing is performed according to embodiments of the present disclosure.

The NLU component 260 may generate cross-speechlet N-best list data 440, which may include a list of NLU hypotheses output by each recognizer 363 (as illustrated in FIG. 4). A recognizer 363 may output tagged text data generated by an NER component 362 and an IC component 364 operated by the recognizer 363, as described above. Each NLU hypothesis including an intent indicator and text/slots called out by the NER component 362 may be grouped as an NLU hypothesis represented in the cross-speechlet N-best list data 440. Each NLU hypothesis may also be associated with one or more respective score(s) for the NLU hypothesis. For example, the cross-speechlet N-best list data 440 may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The NLU component 260 may send the cross-speechlet N-best list data 440 to a pruning component 450. The pruning component 450 may sort the NLU hypotheses represented in the cross-speechlet N-best list data 440 according to their respective scores. The pruning component 450 may then perform score thresholding with respect to the cross-speechlet N-best list data 440. For example, the pruning component 450 may select NLU hypotheses represented in the cross-speechlet N-best list data 440 associated with confidence scores satisfying (e.g., meeting and/or exceeding) a threshold confidence score. The pruning component 450 may also or alternatively perform number of NLU hypothesis thresholding. For example, the pruning component 450 may select a maximum threshold number of top scoring NLU hypotheses. The pruning component 450 may generate cross-speechlet N-best list data 460 including the selected NLU hypotheses. The purpose of the pruning component 450 is to create a reduced list of NLU hypotheses so that downstream, more resource intensive, processes may only operate on the NLU hypotheses that most likely represent the user's intent.

The NLU component 260 may also include a light slot filler component 452. The light slot filler component 452 can take text data from slots represented in the NLU hypotheses output by the pruning component 450 and alter it to make the text data more easily processed by downstream components. The light slot filler component 452 may perform low latency operations that do not involve heavy operations such as reference to a knowledge base. The purpose of the light slot filler component 452 is to replace words with other words or values that may be more easily understood by downstream system components. For example, if an NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-speechlet N-best list data 460.

The NLU component 260 sends the cross-speechlet N-best list data 460 to an entity resolution component 470. The entity resolution component 470 can apply rules or other instructions to standardize labels or tokens from previous stages into an intent/slot representation. The precise transformation may depend on the speechlet component 290. For example, for a travel speechlet component, the entity resolution component 270 may transform text data corresponding to "Boston airport" to the standard BOS three-letter code referring to the airport. The entity resolution component 470 can refer to a knowledge base that is used to specifically identify the precise entity referred to in each slot of each NLU hypothesis represented in the cross-speechlet N-best list data 460. Specific intent/slot combinations may also be tied to a particular source, which may then be used to resolve the text data. In the example "play songs by the stones," the entity resolution component 470 may reference a personal music catalog, Amazon Music account, user profile data, or the like. The entity resolution component 470 may output text data including an altered N-best list that is based on the cross-speechlet N-best list data 460, and that includes more detailed information (e.g., entity IDs) about the specific entities mentioned in the slots and/or more detailed slot data that can eventually be used by a speechlet component 290. The NLU component 260 may include multiple entity resolution components 470 and each entity resolution component 470 may be specific to one or more speechlet components 290.

The entity resolution component 470 may not be successful in resolving every entity and filling every slot represented in the cross-speechlet N-best list data 460. This may result in the entity resolution component 470 outputting incomplete results.

The NLU component 260 may include a ranker component 490. The ranker component 490 may assign a particular confidence score to each NLU hypothesis input therein. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first speechlet component includes slots that are all filled/resolved, that NLU hypothesis may be assigned a higher confidence score than another NLU hypothesis including at least some slots that are unfilled/unresolved by the entity resolution component 470.

The ranker component 490 may apply re-scoring, biasing, or other techniques to determine the top scoring NLU hypotheses. To do so, the ranker component 490 may consider not only the data output by the entity resolution component 470, but may also consider other data 491. The other data 491 may include a variety of information. The other data 491 may include speechlet component 290 rating or popularity data. For example, if one speechlet component 290 has a particularly high rating, the ranker component 490 may increase the score of an NLU hypothesis associated with that speechlet component 290. The other data 491 may also include information about speechlet components 290 that have been enabled for the user identifier and/or device identifier associated with the current user input. For example, the ranker component 490 may assign higher scores to NLU hypotheses associated with enabled speechlet components 290 than NLU hypotheses associated with non-enabled speechlet components 290. The other data 491 may also include data indicating user usage history, such as if the user identifier associated with the current user input is regularly associated with user input that invokes a particular speechlet component 290 or does so at particular times of day. The other data 491 may additionally include data indicating date, time, location, weather, type of device 110, user identifier, device identifier, context, as well as other information. For example, the ranker component 490 may consider when any particular speechlet component 290 is currently active (e.g., music being played, a game being played, etc.) with respect to the user or device associated with the current user input. The other data 291 may also include device type information. For example, if the device 110 does not include a display, the ranker component 490 may decrease the score associated with NLU hypotheses that would result in displayable content being presented to a user.

Following ranking by the ranker component 490, the NLU component 260 may output NLU results data 485 to the orchestrator component 230. The NLU results data 485 may include first NLU results data 485*a* including tagged text data associated with a first speechlet component 290*a*, second NLU results data 485*b* including tagged text data associated with a second speechlet component 290*b*, etc. The NLU results data 485 may include the top scoring NLU hypotheses (e.g., in the form of an N-best list) as determined by the ranker component 490. Alternatively, the NLU results data 485 may include the top scoring NLU hypothesis as determined by the ranker component 490.

Prior to the orchestrator component 230 sending text data to the NLU component 260, the orchestrator component 230 may determine whether the device 110 is associated with a device-specific speechlet component 290. The orchestrator component 230 may use the device identifier, received from the device 110, to determine device profile data associated with the device 110. The orchestrator component 230 may determine the device profile data represents a speechlet component identifier unique to a device-specific speechlet component associated with the device 110. Alternatively, the orchestrator component 230 may determine the device profile data represents a manufacturer of the device 110. The orchestrator component 230 may then determine whether the system includes a device-specific speechlet component associated with the device manufacturer.

If the orchestrator component 230 determines the device 110 is associated with a device-specific speechlet component, the orchestrator component 230 calls the NLU component 260 twice. The orchestrator component 230 calls the NLU component 260 to perform NLU processing on text data (received from the device 110, or output by the ASR component 250) with respect to various speechlet components of the system, as described above with respect to FIGS. 3 and 4. The orchestrator component 230 also separately calls the NLU component 260 to perform NLU processing on the text data specifically with respect to the device-specific speechlet component. The NLU component 260 may perform the foregoing processing at least partially in parallel, and output NLU results of the respective processing to the orchestrator component 230. The orchestrator component 230 may then rank the received NLU results to determine which speechlet component should be called to execute with respect to the current user input.

Figure 5:
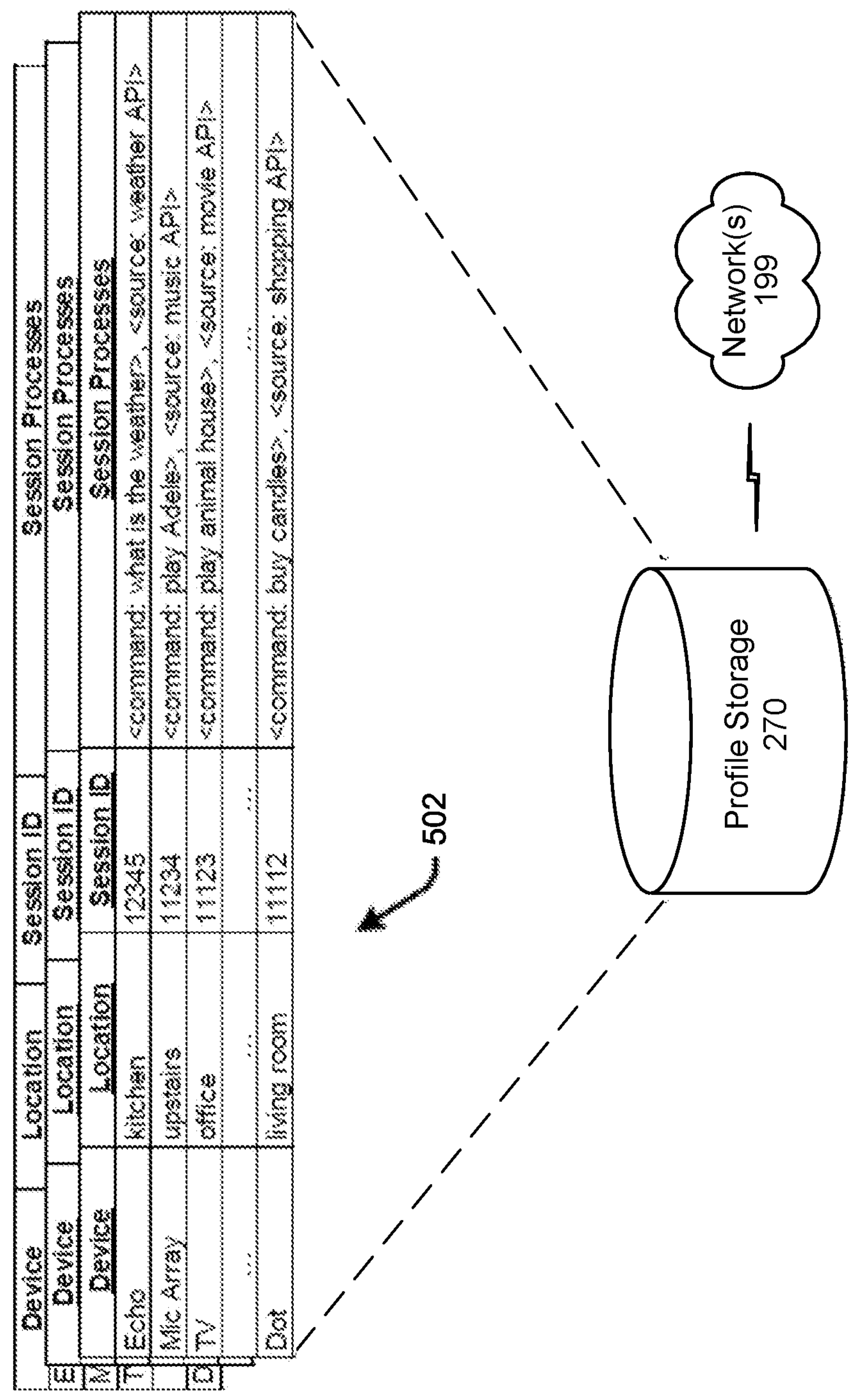
FIG. 5 illustrates data stored and associated with user profiles according to embodiments of the present disclosure.

FIG. 5 illustrates data stored and associated with user accounts according to embodiments of the present disclosure. The server(s) 120 may include or refer to data regarding user accounts 502 (e.g., user profile(s)), shown by the profile storage 270 illustrated in FIG. 5. The profile storage 270 may be located proximate to server(s) 120, or may otherwise be in communication with various components, for example over network(s) 199. In an example, the profile storage 270 is a cloud-based storage.

As discussed above, the profile storage 270 may include a variety of information related to individual users, households, accounts, etc. that interact with the system 100. For illustration, as shown in FIG. 5, each user profile 502 may include data such as device type information, device location information, session ID information, and processes performed with respect to each session ID. Each user profile 502 may also include information about previous usage history (e.g., number of times an application is used), previous commands/intents, temporal information or the like. In addition, a user profile 502 may store other data as well. In some examples, the profile storage 270 may include data regarding devices associated with particular individual user accounts 502. Such data may include device identifier (ID) and internet protocol (IP) address information for different devices as well as names by which the devices may be referred to by a user. Further qualifiers describing the devices may also be listed along with a description of the type of object of the device.

Figure 6:
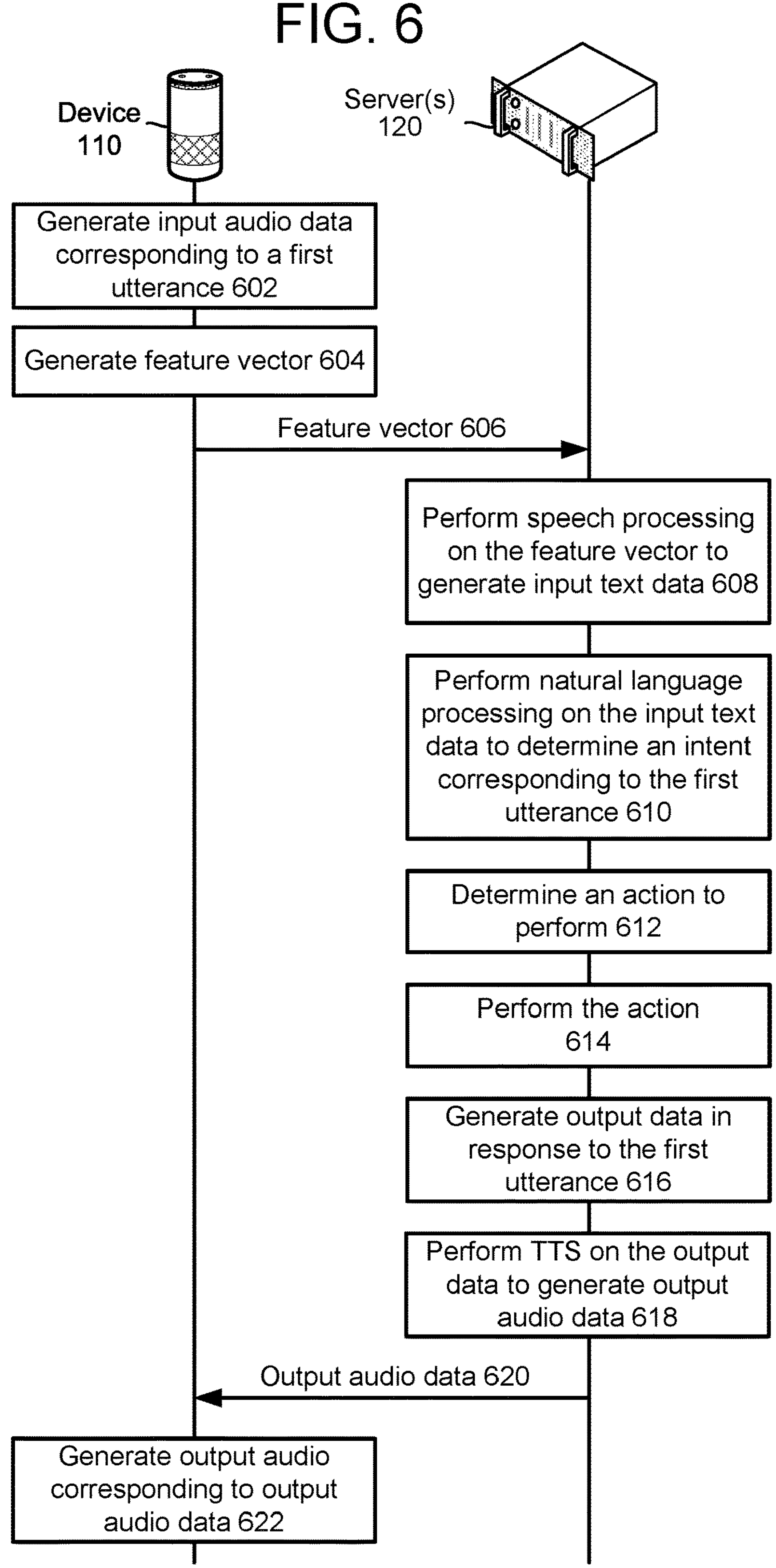
FIG. 6 is a signal flow diagram illustrating an example of processing speech and generating output audio according to embodiments of the present disclosure.

FIG. 6 is a signal flow diagram illustrating an example of processing speech and generating output audio according to embodiments of the present disclosure. A device 110 may generate (602) input audio data corresponding to an utterance of a user. For example, the device 110 may capture input audio using one or more microphone(s) 114 and may generate the input audio data representing the utterance. Using the input audio data, the device 110 may generate (604) a feature vector corresponding to the utterance and send (606) the feature vector to the server(s) 120 for speech processing.

When the server(s) 120 receives the feature vector, the server(s) 120 may perform (608) speech processing on the feature vector to generate input text data. The server(s) 120 may also perform (610) natural language processing on the input text data to determine an intent of a user command represented in the utterance. Based on the intent of the user command, the server(s) 120 may determine (612) an action to perform and may perform (614) the action. For example, the server(s) 120 may determine that the user wants to play music and may identify a music source available to the user from which to stream. However, the disclosure is not limited thereto and the server(s) 120 may perform any action known to one of skill in the art without departing from the disclosure. Additionally or alternatively, the server(s) 120 may send a command to the device 110 to perform the action without departing from the disclosure.

After performing the action in step 614, the server(s) 120 may generate (616) output data in response to the first utterance and may perform (618) text-to-speech (TTS) processing on the output data to generate output audio data. For example, the output data may include text data to be output to a user as synthesized speech and the server(s) 120 may perform TTS processing to generate the output audio data including the synthesized speech.

The server(s) 120 may send (620) the output audio data to the user device 110 and the device 110 may generate (622) output audio corresponding to the output audio data. For example, using the output audio data and the loudspeaker(s) 116, the device 110 may generate the output audio for a user 5 local to the device 110. If the user 5 responds to the audio, the device 110 may receive second input audio corresponding to a second utterance and repeat the steps listed above.

For ease of illustration, FIG. 6 illustrates a high level signal flow diagram encompassing the overall system for processing speech and generating output audio. However, the server(s) 120 may perform additional steps to determine an intent corresponding to the speech and generate output audio.

The device 110 may generate input audio data using microphone(s) 114. For example, the microphone(s) 114 may generate first input audio data in a time domain. For computational efficiency, however, the system 100 may convert the first input audio data to second input audio data in a frequency domain prior to processing the input audio data. Thus, the first input audio data (e.g., time-discrete signal) is transformed into the second input audio data in the frequency domain or subband domain. To convert from the time domain to the frequency or subband domain, the system 100 may use Discrete Fourier Transforms (DFTs), such as Fast Fourier transforms (FFTs), short-time Fourier Transforms (STFTs), and/or the like.

The following high level description of converting from the time domain to the frequency domain refers to microphone audio data $x(n)$, which is a time-domain signal comprising output from the microphone(s) 114. As used herein, a variable $x(n)$ corresponds to the time-domain signal, whereas a variable $X(n)$ corresponds to a frequency-domain signal (e.g., after performing FFT on the microphone audio data x(n)). A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data X(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "m" is a frequency index (e.g., frequency bin).

Figure 7A:
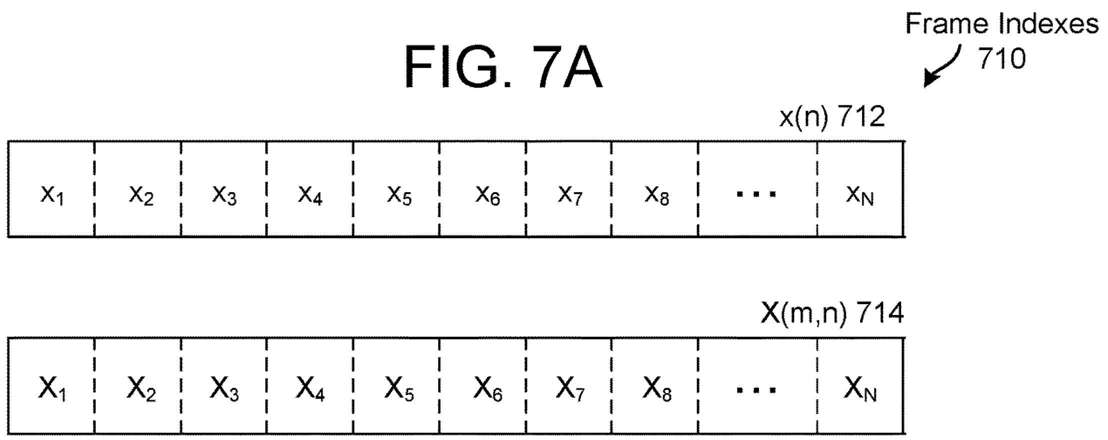
FIGS. 7A-7C illustrate examples of channel indexes, tone indexes and frame indexes.

FIG. 7A illustrates an example of frame indexes 710 including microphone audio data x(n) 712 in the time domain and microphone audio data X(m, n) 714 in the frequency domain. For example, the system 100 may apply a FFT to the time-domain microphone audio data x(n) 712, producing the frequency-domain microphone audio data X(m,n) 714, where the tone index "m" ranges from 0 to M and "n" is a frame index ranging from 0 to N. As illustrated in FIG. 7A, the history of the values across iterations is provided by the frame index "n", which ranges from 1 to N and represents a series of samples over time.

Figure 7B:
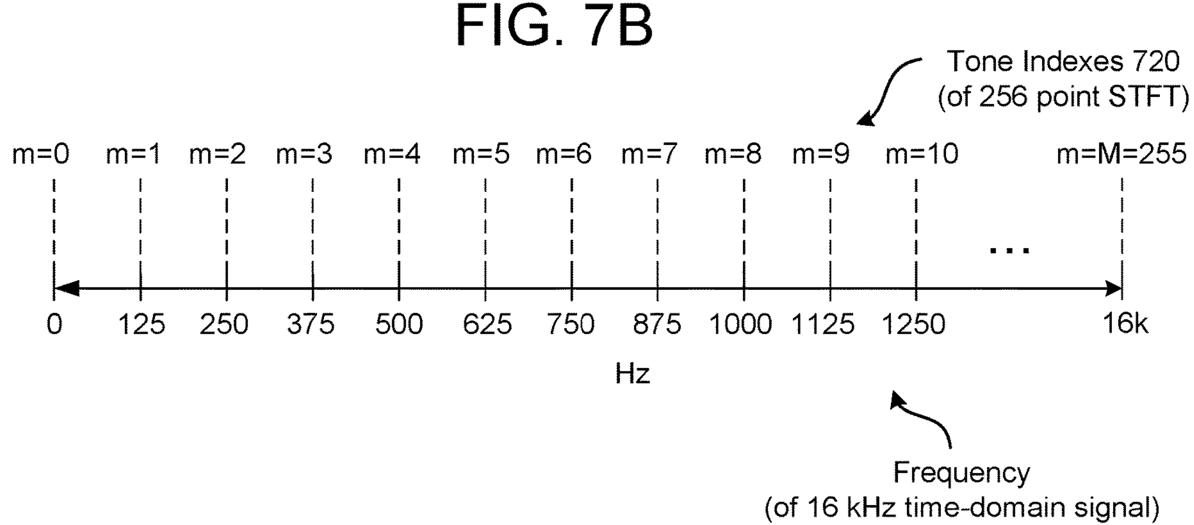

FIG. 7B illustrates an example of performing an M-point FFT on a time-domain signal. As illustrated in FIG. 7B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 7B, each tone index 720 in the 256-point FFT corresponds to a frequency range (e.g., subband) in the 16 kHz time-domain signal. While FIG. 7B illustrates the frequency range being divided into 256 different subbands (e.g., tone indexes), the disclosure is not limited thereto and the system 100 may divide the frequency range into M different subbands. While FIG. 7B illustrates the tone index 720 being generated using a Fast Fourier Transform (FFT), the disclosure is not limited thereto. Instead, the tone index 720 may be generated using Short-Time Fourier Transform (STFT), generalized Discrete Fourier Transform (DFT) and/or other transforms known to one of skill in the art (e.g., discrete cosine transform, non-uniform filter bank, etc.).

Given a signal x[n], the FFT X(m,n) of x[n] is defined by $$X(m,n)=\sum_{k=0}^{K-1}x_k e^{-i2\pi*m*n*k/K} \quad [1]$$

Where m is a frequency index, n is a frame index, and K is an FFT size. Hence, for each block (at frame index n) of K samples, the FFT is performed which produces K complex tones X(m,n) corresponding to frequency index m and frame index n.

Figure 7C:
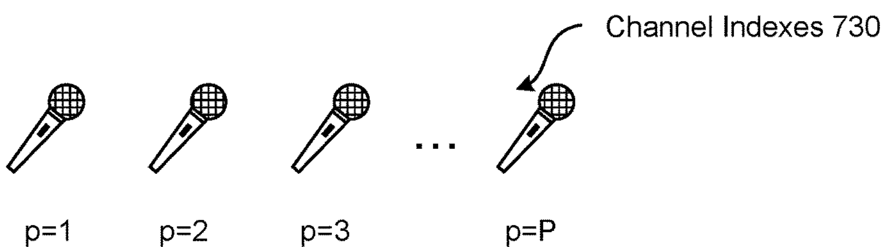

The system 100 may include multiple microphone(s) 114, with a first channel p corresponding to a first microphone 114*a*, a second channel (p+1) corresponding to a second microphone 114*b*, and so on until a final channel (P) that corresponds to microphone 114P. FIG. 7C illustrates channel indexes 730 including a plurality of channels from channel p to channel P. While many drawings illustrate two channels (e.g., two microphones 114), the disclosure is not limited thereto and the number of channels may vary. For the purposes of discussion, an example of system 100 includes "P" microphones 114 (P >1) for hands free near-end/far-end distant speech recognition applications.

Figure 8:
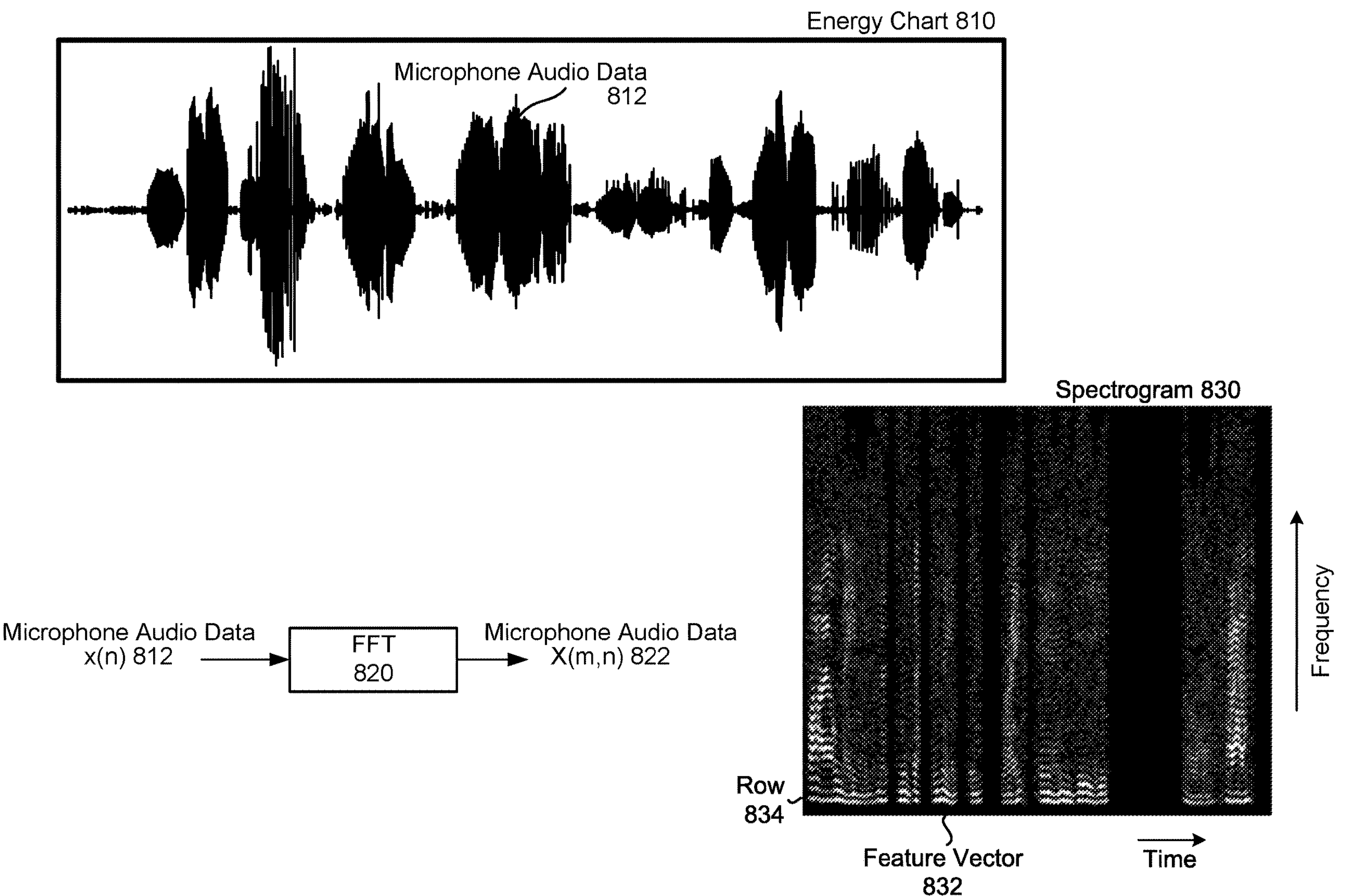
FIG. 8 illustrates examples of audio data in a time domain and a frequency domain.

FIG. 8 illustrates examples of audio data in a time domain and a frequency domain. As illustrated in FIG. 8, energy chart 810 represents microphone audio data x(n) 812 in a time domain, which can be converted using FFT 820 to microphone audio data X(m,n) 822 in a frequency domain. The microphone audio data X(m,n) 822 may be a one dimensional vector of complex numbers, which may be used to calculate a two dimensional matrix of frequency magnitude versus frequency. The system 100 may track an amplitude of each frequency over time, illustrated by spectrogram 830. As illustrated in FIG. 8, the spectrogram 830 may represent time along the horizontal axis (e.g., x-axis) and may represent frequency along the vertical axis (e.g., y-axis), with a magnitude represented by a color between black (e.g., low magnitude) and white (e.g., high magnitude). For example, a feature vector 832 may correspond to a specific point in time, with each row 834 corresponding to a specific frequency. Thus, the microphone audio data X(m, n) 822 enables the system 100 to determine a magnitude associated with each frequency and/or analyze individual frequency bands of the microphone audio data separately.

While FIG. 8 illustrates an example of the microphone audio data X(m,n) 822 in the spectrogram 830, this is intended for ease of illustration and the disclosure is not limited thereto. Instead, while the spectrogram 830 may only illustrate a magnitude and/or power of the microphone audio data X(m,n) 822, the microphone audio data X(m,n) 822 may be comprised of real and imaginary components that are used by the device 110 to perform beamforming or the like. For example, the real and imaginary components of the microphone audio data X(m,n) 822 may include phase information that indicates a time difference between two microphones. Using this phase information, the device 110 may determine which microphone captured audio first and/or perform beamforming.

FIG. 9 is a conceptual diagram illustrating components of a conventional audio front-end as well as components of a front-end deep neural network (DNN) according to embodiments of the present disclosure.

As illustrated in FIG. 9, a conventional front-end 900 may receive input audio data (e.g., $\text{Input}_1$ and $\text{Input}_2$) from at least two microphones 114. While FIG. 9 illustrates receiving input audio data from only two microphones, in some examples the conventional front-end 900 may receive input audio data from three or more microphones 114. This input audio data is in the time domain, so Time/Frequency Transform 910*a* and 910*b* may convert the input audio data to the frequency domain prior to beamforming.

Beamforming 912 refers to processing the input audio data to separate the input audio data into individual signals that correspond to a plurality of directions, with each signal corresponding to a particular direction. This may be referred to as beamforming (e.g., microphone array processing) and it improves speech processing by isolating audio data generated in a specific direction. After beamforming, beamformer selection 914 may select a single audio signal (e.g., beamformed audio data) with the highest energy. However, in some examples the beamformer selection 914 may select two or more audio signals.

In some examples, the beamforming 912 and the beamformer selection 914 may be performed on a local device and the local device may upload the beamformed audio data (e.g., in the frequency domain) to a remote device (e.g., the server(s) 120 or the like) for further processing. However, the conventional front-end 900 is not limited thereto and in some examples the beamforming 912, the beamformer selection 914, and the frequency/time transform 916 may be performed on the local device and the local device may upload the beamformed audio data (e.g., in the time domain), may perform additional processing, and/or the like.

The remote server(s) may receive the beamformed audio data (e.g., in the frequency domain) and Frequency/Time Transform 916 may then convert the beamformed audio data back into the time domain (e.g., reconstruct the time-domain signal). The remote server(s) 120 may perform feature extraction on the time-domain signal, such as log-mel filter bank energy (LFBE) feature extraction (e.g., LFBE extraction 918), to generate a feature vector. For example, the LFBE extraction 918 may perform a series of steps, including performing a Fourier Transform (e.g., STFT, FFT or the like) and applying filters (e.g., triangular filters) in a filter bank on a Mel-scale to the power spectrum to extract frequency bands. The Mel-scale aims to mimic the non-linear human ear perception of sound, by being more discriminative at lower frequencies and less discriminative at higher frequencies. For example, converting between Hertz (f) and Mel (m) may use the following equations:

$$m = 2595^{*}\log_{10}\left(1 + \frac{f}{700}\right) \quad [2]$$

$$f = 700(10^{m/2595} - 1) \quad [3]$$

Each filter in the filter bank is triangular having a response of 1 at the center frequency and decrease linearly towards 0 till it reaches the center frequencies of the two adjacent filters where the response is 0.

Thus, the feature vector may indicate a magnitude of energy in individual frequency bands of the beamformed audio data, where the frequency bands are non-uniform and based on the Mel-scale. However, the conventional front-end 900 is not limited thereto and in some examples the LFBE extraction 918 may determine Mel-Frequency Cepstrum Coefficients (MFCCs) instead. For example, the filter bank coefficients used by the LFBE extraction 918 may be highly correlated, which can be a problem for some machine learning algorithms. To avoid this, the LFBE extraction 918 may apply Discrete Cosine Transform (DCT) to decorrelate the filter bank coefficients and yield a compressed representation of the filter banks (e.g., a process also referred to as whitening). In some examples, the resulting cepstral coefficients 2-13 may be retained and the rest may be discarded.

Regardless of whether the conventional front-end 900 uses Mel-scaled filter banks and/or Mel-Frequency Cepstrum Coefficients (MFCCs), the conventional front-end 900 may perform feature normalization 920 to normalize the feature vector. For example, the feature normalization 920 may perform causal and global mean-variance normalization. In some examples, the feature normalization 920 may subtract the mean of each coefficient from all frames to generate a mean-normalized feature vector. Thus, the feature normalization 920 balances the spectrum and improves a Signal-to-Noise ratio (SNR) or other signal quality metric of the output of the conventional front-end 900.

The conventional front-end 900 may output a normalized feature vector to a classification DNN 930 to perform acoustic unit classification (e.g., acoustic modeling). In some examples, the classification DNN 930 may be included in the ASR component 250, although the disclosure is not limited thereto. For example, the classification DNN may detect distinct short sounds (e.g., predict ASR senon or phoneme targets, sometimes referred to as acoustic modeling). The results from the acoustic modeling may be used in a language modeling operation to ultimately generate output text, which may be used for NLU processing. ASR operations may include both acoustic modeling and language modeling. As illustrated in FIG. 9, the classification DNN 930 may include 5 long short-term memory components (LSTMs) 930, affine transform 932 and softmax 934 layers. The classification DNN 930 is trained using data in the form of the normalized LFBE features in order to classify senons. The posterior of each senon is associated with the Hidden Markov Model (HMM) state.

Each LSTM of the 5 LSTMs 930 may be configured to "remember" values over an arbitrary time limit, as understood by one of skill in the art. The affine transform 932 may apply an affine transform (or affine transformation), which may be represented using the following equation:

$$\vec{y} = f(\vec{x}) = A\vec{x} + \vec{b} \quad [4]$$

Additionally or alternatively, an affine transform may be represented using an augmented matrix and an augmented vector to enable matrix multiplication. The technique requires that all vectors are augmented with a "1" at the end, and all matrices are augmented with an extra row of zeros at the bottom, an extra column (e.g., the translation vector) to the right, and a "1" in the lower right corner. For example, if A is a matrix, then equation [4] is equivalent to the following affine transformation matrix:

$$\begin{bmatrix} \vec{y} \\ 1 \end{bmatrix} = \left[\begin{array}{c|c} A & \vec{b} \\ 0 \ldots 0 & 1 \end{array}\right] \begin{bmatrix} \vec{x} \\ 1 \end{bmatrix} \quad [5]$$

Finally, the softmax 934 may apply a softmax function (e.g., normalized exponential function) to highlight the largest values and suppress values which are significantly below the maximum value.

Thus, a conventional far-field speech recognition system (e.g., distant speech recognition system) consists of distinct components for beamforming (e.g., beamforming 912 and beamformer selection 914), feature extraction (e.g., LFBE extraction 918 and feature normalization 920) and acoustic units classification (e.g., classification DNN 930). These distinct components are typically optimized individually for signal enhancement (e.g., audio signal sounds clearer due to less noise).

To improve speech processing, the present disclosure illustrates an example architecture that includes a DNN-based acoustic model front-end that mimics beamforming and feature extraction in a data-driven manner. For example, FIG. 9 illustrates a new architecture that replaces the conventional audio front-end 900 with a new modeling approach where multi-channel input audio data from the microphone(s) 114 is directly modeled in DNN front-end 950.

The DNN front-end 950 includes an input stage that receives input audio data (e.g., $Input_1$ and $Input_2$) for each input channel (e.g., from each of the microphone(s) 114) and performs input processing 952. For example, the DNN front-end 950 may convert the input audio data from a time domain to a frequency domain and/or perform normalization to control a magnitude of the modified input audio data.

In some examples, the input processing 952 may perform Fast Fourier Transform (FFT) processing, global mean and variance normalization (GMVN), or other normalization processing to generate the modified input audio data. For example, the FFT processing may convert the input audio data from the time domain to the frequency domain using any technique known to one of skill in the art. After converting to the frequency domain, GMVN processing normalizes the input audio data by transforming the input audio data to a global mean and global variance. Thus, normalizing the input audio data may standardize values based on a uniform scale, which may eliminate mismatches between training and test utterances as well as between utterances from different users. However, the disclosure is not limited thereto and the system 100 may perform normalization using any technique known to one of skill in the art without departing from the disclosure.

In some examples, the input processing 952 may perform FFT processing and/or GMVN processing separately for each input channel, although the disclosure is not limited thereto. For example, FIG. 9 illustrates the DNN front-end 950 receiving two input channels, with first input audio data $Input_1$ being processed by first input processing 952*a* and second input audio data $Input_2$ being processed by second input processing 952*b*. After the input audio data is converted to the frequency domain (e.g., using FFT processing) and/or normalized (e.g., using GMVN processing) to generate Discrete Fourier Transform (DFT) coefficients, the two channels of input audio data are concatenated and passed to a multi-channel deep neural network (DNN) 960. However, the disclosure is not limited thereto and the DNN front-end 950 may modify the input audio data using any technique known to one of skill in the art before inputting the input audio data to the multi-channel DNN 960. For example, the DNN front-end 950 may use any technique to convert the input audio data to the frequency domain and/or to normalize the input audio data without departing from the disclosure.

The multi-channel DNN 960 takes raw signals collected from multiple microphones and produces a compact representation (e.g., first feature vector) that may be used similarly to beamformed features generated by beamforming 912 and/or beamformer selection 914. For example, as will be discussed in greater detail with regard to FIG. 10, the multi-channel DNN 960 may perform spatial filtering to separate the input audio data into a plurality of directions and determine an amount of energy in individual frequency bands for each of the plurality of directions.

The output of the multi-channel DNN 960 (e.g., first feature vector) is sent to feature extraction DNN 970, which transforms this output to a lower dimensional representation (e.g., second feature vector). For example, the feature extraction DNN 970 may multiply the first feature vector by a matrix to combine multiple frequency bands based on the Mel-scale. The Mel-scale aims to mimic the non-linear human ear perception of sound, by being more discriminative at lower frequencies and less discriminative at higher frequencies, as discussed above with regard to equations [2] and [3]. Thus, the second feature vector may indicate a magnitude of energy in individual frequency bands of the beamformed audio data, where the frequency bands are non-uniform and based on the Mel-scale. For example, the first feature vector output by the multi-channel DNN 960 may include a plurality of frequency ranges having a first size, whereas the second feature vector output by the feature extraction DNN 970 may include a plurality of frequency ranges having varying sizes (e.g., second size, third size, etc.) based on the Mel-scale. However, the feature extraction DNN 970 is not limited thereto and in some examples the feature extraction DNN 970 may determine Mel-Frequency Cepstrum Coefficients (MFCCs) without departing from the disclosure While feature extraction corresponding to LFBE extraction 918 is performed using a remote device, the device 110 may perform feature extraction DNN 970 locally and send the second feature vector to the server(s) 120 to perform acoustic unit classification using the classification DNN 930, which is identical to the classification DNN 930 described above. For example, the classification DNN 930 may detect distinct short sounds (e.g., predict ASR senon or phoneme targets, sometimes referred to as acoustic modeling). The results from the acoustic modeling may be used in a language modeling operation to ultimately generate output text, which may be used for NLU processing. ASR operations may include both acoustic modeling and language modeling. As illustrated in FIG. 9, the classification DNN 930 may include 5 long short-term memory components (LSTMs) 930, affine transform 932 and softmax 934 layers. The classification DNN 930 is trained using data in the form of the second feature vector in order to classify senons. The posterior of each senon is associated with the Hidden Markov Model (HMM) state.

By replacing the conventional audio front-end 900 with the DNN front-end 950, the far-field speech recognition system may be jointly optimized for ASR processing (as opposed to individually optimized for signal enhancement). For example, the multi-channel DNN 960, the feature extraction DNN 970, and the classification DNN 930 may be jointly optimized, despite being divided between the device 110 and the server(s) 120, by optimizing each processing block in a stage-wise manner. Additionally or alternatively, the far-field speech recognition system may be optimized to capture speech (e.g., target phonemes), even if this results in more noise, as this improves performance of ASR processing.

Another benefit of using the DNN front-end 950 is that the system may be able to obtain desired system performance even if there is a reduction in a number of microphones, as performance using the techniques herein may be similar using two microphones for audio capture as it is using four or more microphones. However, the disclosure is not limited thereto and the DNN front-end 950 may receive input audio data from three or more microphones 114 without departing from the disclosure. Additionally or alternatively, a bandwidth requirement may be reduced during real time processing as the device 110 only needs to upload low dimensional feature vectors (e.g., a second feature vector) for speech processing by the server(s) 120 rather than sending more bandwidth intensive raw audio data (or other data). In some examples, the raw input audio data may be uploaded at a later point in time (for example for system correction and/or retraining), although the disclosure is not limited thereto and the device 110 may either upload or not upload the raw audio data without departing from the disclosure.

FIG. 10 is a conceptual diagram of components of multi-channel DNNs according to embodiments of the present disclosure. As illustrated in FIG. 10, the multi-channel DNN 960 may use one of three different architectures to generate the first feature vector. However, the disclosure is not limited thereto and the examples illustrated in FIG. 10 are intended merely to illustrate potential architectures. While FIG. 10 illustrates potential implementations for the multi-channel DNN 960, the multi-channel DNN 960 may use any technique known to one of skill in the art without departing from the disclosure.

A first architecture is illustrated in FIG. 10 by complex affine transform 1020, which may receive normalized-multi-channel input audio data 1010 in the frequency domain and perform a complex affine transform (CAT) 1022 and power 1024 calculation to generate the first feature vector. The complex affine transform 1022 performs a transformation on the input audio data 1010 to generate an intermediate feature vector indicating an amount of energy in individual frequency bands, and the power 1024 calculation determines an amount of power in the individual frequency bands.

A second architecture is illustrated in FIG. 10 by deterministic spatial filtering DNN 1030, which may receive normalized-multi-channel input audio data 1010 in the frequency domain, perform a block affine transform 1032, power 1034 calculation, and MaxPool 1036 calculation to generate the first feature vector. The block affine transforms 1032 performs a transformation on the input audio data 1010 in order to separate the input audio data 1010 into a plurality of directions and determine an amount of energy in individual frequency bands for each of the plurality of directions, similar to beamforming. The power 1034 calculation corresponds to a complex square computation (e.g., calculates a sum of a square on a pair of outputs from the block affine transforms 1032) that determines an amount of power in the individual frequency bands for each of the plurality of directions. The MaxPool 936 calculation performs a max-pooling operation meant to mimic beamformer selection based on a maximum power at each frequency band (e.g., frequency bin). However, due to the deterministic nature of this output selection, it may not be capable of recovering a selection error. To alleviate the unrecoverable error, the deterministic spatial filtering DNN 1030 allows the block affine transforms 1032 to interact with different frequency components. For example, the output of the deterministic spatial filtering DNN 1030 for each frequency $\omega_k$ may be expressed as the following affine transform:

$$Y(\omega_k) = \max\left( \text{pow}\left( \begin{bmatrix} 0_{M(k-1)} & w_{SD}^H(\omega_k, p_1) & 0_{M(K-k)} \\ & \vdots & \\ 0_{M(k-1)} & w_{SD}^H(\omega_k, p_D) & 0_{M(K-k)} \end{bmatrix} \begin{bmatrix} X(\omega_1) \\ X(\omega_2) \\ \vdots \\ X(\omega_K) \end{bmatrix} + b \right) \right) \quad [6]$$

where $\omega_k$ is a frequency band (e.g., frequency bin), K is a number of different frequency bands (e.g., [k=1 K]), $Y(\omega_k)$ is a single output of the deterministic spatial filtering DNN 1030 for a single frequency band, max( ) corresponds to the max-pooling operation, pow( ) is the sum of squares of two adjacent values, $0_L$ is an L-dimension zero vector for initializing a non-target frequency weight to zero, $0_0$ represents null, $w_{SD}^H$ are existing beamformer coefficients corresponding to particular look directions pa for each frequency band $\omega_k$, D is a number of different look directions (e.g., [d=1 . . . D]), $X(\omega_k)$ is an input FFT from multiple channels (e.g., concatenated multi-channel feature vector corresponding to the input audio data 1010), and b is a bias vector. Thus, each row corresponds to a different look direction (e.g., from a first look direction $p_1$ to a final look direction $p_D$), and initializing the first layer (e.g., block affine transforms 1032) with beamformer coefficients $w_{SD}^H$ (e.g., beamformer weights) improves results.

A third architecture is illustrated in FIG. 10 by elastic spatial filtering DNN 1040, which may receive normalized-multi-channel input audio data 1010 in the frequency domain, perform a block affine transform 1042, power 1044 calculation, affine transform 1046, and Rectified Linear Unit (Relu) 948 calculation to generate the first feature vector. As discussed above with regard to the deterministic spatial filtering DNN 1030, the block affine transforms 1042 performs a transformation on the input audio data 1010 in order to separate the input audio data 1010 into a plurality of directions and determine an amount of energy in individual frequency bands for each of the plurality of directions, similar to beamforming, and the power 1044 calculation corresponds to a complex square computation (e.g., calculates a sum of a square on a pair of outputs from the block affine transforms 1042) that determines an amount of power in the individual frequency bands for each of the plurality of directions. For example, the output of the power 1044 calculation may be represented by a block of frequency independent affine transforms:

$$\begin{bmatrix} Y_1(\omega_1) \\ \vdots \\ Y_D(\omega_1) \\ \vdots \\ Y_1(\omega_K) \\ \vdots \\ Y_D(\omega_K) \end{bmatrix} = \text{pow}\begin{pmatrix} w_{SD}^H(\omega_1, p_1)X(\omega_1) + b_1 \\ \vdots \\ w_{SD}^H(\omega_1, p_D)X(\omega_1) + b_D \\ \vdots \\ w_{SD}^H(\omega_K, p_1)X(\omega_K) + b_{D(K-1)+1} \\ \vdots \\ w_{SD}^H(\omega_K, p_D)X(\omega_K) + b_{DK} \end{pmatrix} \quad [7]$$

where $\omega_k$ is a frequency band (e.g., frequency bin), K is a number of different frequency bands (e.g., [k=1 K]), D is a number of different look directions (e.g., [d=1 D]), $Y_d(\omega_k)$ is an output of the elastic spatial filtering DNN 1040 for a single frequency band k and a single look direction $p_d$, pow( ) is the sum of squares of two adjacent values, $w_{SD}^H$ are existing beamformer coefficients corresponding to particular look directions pa for each frequency band $\omega_k$, $X(\omega_k)$ is an input FFT from multiple channels (e.g., concatenated multi-channel feature vector corresponding to the input audio data 1010), and b is a bias vector (e.g., $[b=b_1 \ldots b_{DK}]$ for each look direction $p_d$ and frequency band $\omega_k$. Thus, the output of the power 1044 calculation is a vector or matrix with each row indicating a power associated with an individual look direction $p_d$ and frequency band $\omega_k$. The beamforming weights and bias vectors will be updated during training.

While the deterministic spatial filtering DNN 1030 mimics beamforming by selecting a maximum power at each frequency band (e.g., similar to beamformer selection 914), the elastic spatial filtering DNN 1040 does not. Instead, the elastic spatial filtering DNN 1040 performs another affine transform 1046 to determine a combined power corresponding to multiple look directions. Thus, beamformer selection errors can be alleviated by combining the weighted output of two or more look directions. The output of the affine transform 1046 is input to the Relu 1048 calculation, which replaces negative numbers with a value of zero so that the output of the multi-channel DNN 960 does not include any negative numbers.

Figure 11:
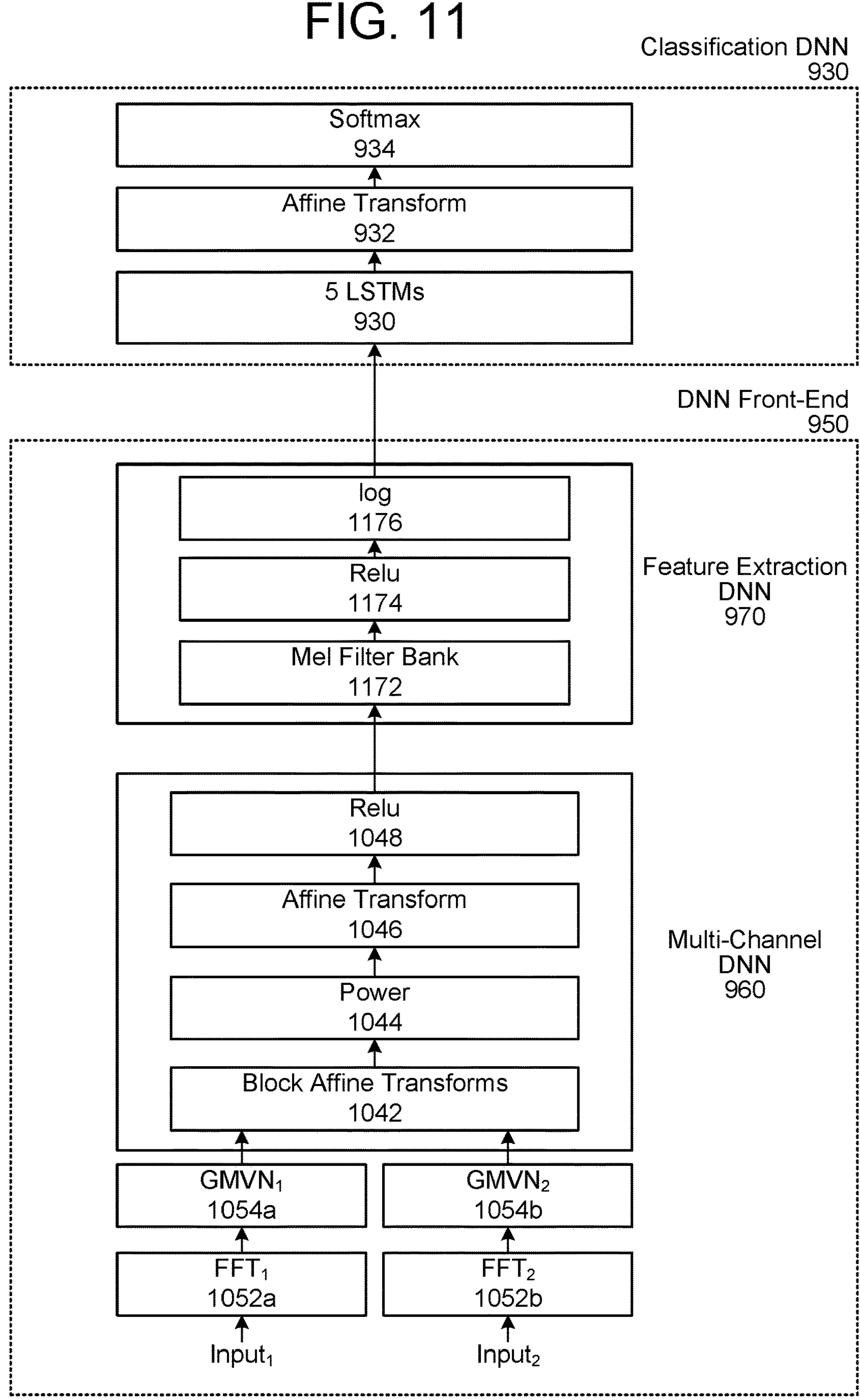
FIG. 11 is a conceptual diagram illustrating components of a front-end DNN according to embodiments of the present disclosure.

FIG. 11 is a conceptual diagram illustrating components of a front-end DNN according to embodiments of the present disclosure. As illustrated in FIG. 11, the DNN front-end 950 includes an input stage that receives input audio data (e.g., Input and $Input_2$) for each input channel (e.g., from each of the microphone(s) 114) and performs Fast Fourier Transform (FFT) 1052 processing and global mean and variance normalization (GMVN) 1054 processing separately for each input channel. For example, FIG. 11 illustrates the DNN front-end 950 receiving two input channels, with first input audio data Input being processed by $FFT_1$ 1052*a* and $GMVN_1$ 1054*a* and second input audio data $Input_2$ being processed by $FFT_2$ 1052*b* and $GMVN_2$ 1054*b*.

The FFT 1052 processing may convert the input audio data from the time domain to the frequency domain using any technique known to one of skill in the art. After converting to the frequency domain, the GMVN 1054 (or other normalization component) normalizes the input audio data by transforming the input audio data to a global mean and global variance. Thus, normalizing the input audio data may standardize values based on a uniform scale, which may eliminate mismatches between training and test utterances as well as between utterances from different users. However, the disclosure is not limited thereto and the system 100 may perform normalization using any technique known to one of skill in the art without departing from the disclosure.

After the input audio data is converted to the frequency domain (e.g., using FFT 1052) and normalized (e.g., using GMVN 1054) to generate Discrete Fourier Transform (DFT) coefficients, the two channels of input audio data are concatenated and passed to a multi-channel deep neural network (DNN) 960.

While FIG. 11 illustrates the steps of performing FFT and GMVN as two separate steps, the disclosure is not limited thereto. Instead, the DNN front-end 950 may perform both FFT and GMVN as a single step without departing from the disclosure.

While FIG. 11 illustrates the DNN front-end 950 performing FFT 1052 processing, this is intended to illustrate a single example and the disclosure is not limited thereto. Instead, as FFT processing is just one technique to convert a signal from the time domain to the frequency domain, the DNN front-end 950 may use any technique known to one of skill in the art without departing from the disclosure.

The multi-channel DNN 960 takes raw signals collected from multiple microphones and produces a compact representation (e.g., first feature vector, first feature vector data, etc.) that may be used similarly to beamformed features generated by beamforming 912 and/or beamformer selection 914. For example, as discussed in greater detail above with regard to FIG. 10, the multi-channel DNN 960 may perform spatial filtering to separate the input audio data into a plurality of directions and determine an amount of energy in individual frequency bands for each of the plurality of directions. FIG. 11 illustrates the multi-channel DNN 960 comprising the third architecture discussed above, including the block affine transforms 1042, power 1044 calculation, affine transform 1046, and Relu 1048.

The output of the multi-channel DNN 960 (e.g., first feature vector) is sent to feature extraction DNN 970, which transforms this output to a lower dimensional representation (e.g., second feature vector, second feature vector data, etc.). For example, the feature extraction DNN 970 may multiply the first feature vector by a Mel filter bank 1172 (e.g., affine matrix weighted to convert to the Mel-scale) to combine multiple frequency bands based on the Mel-scale. The feature extraction DNN 970 may then perform a Rectified Linear Unit (Relu) 1174 calculation to replace negative values with a value of zero prior to performing a log 1176 calculation to generate the second feature vector. As discussed above with regard to equations [2] and [3], the Mel-scale aims to mimic the non-linear human ear perception of sound, by being more discriminative at lower frequencies and less discriminative at higher frequencies. Thus, the second feature vector may indicate a magnitude of energy in individual frequency bands of the beamformed audio data, where the frequency bands are non-uniform and based on the Mel-scale.

The device 110 may generate the second feature vector and send the second feature vector to the server(s) 120 to perform acoustic unit classification using the classification DNN 930. For example, the classification DNN 930 may detect distinct short sounds (e.g., predict ASR senon or phoneme targets) and ultimately generate text for NLU processing. As illustrated in FIG. 11, the classification DNN 930 may include 5 long short-term memory components (LSTMs) 930, affine transform 932 and softmax 934 layers. The classification DNN 930 is trained using data in the form of the second feature vector in order to classify senons. The posterior of each senon is associated with the Hidden Markov Model (HMM) state.

Figure 12:
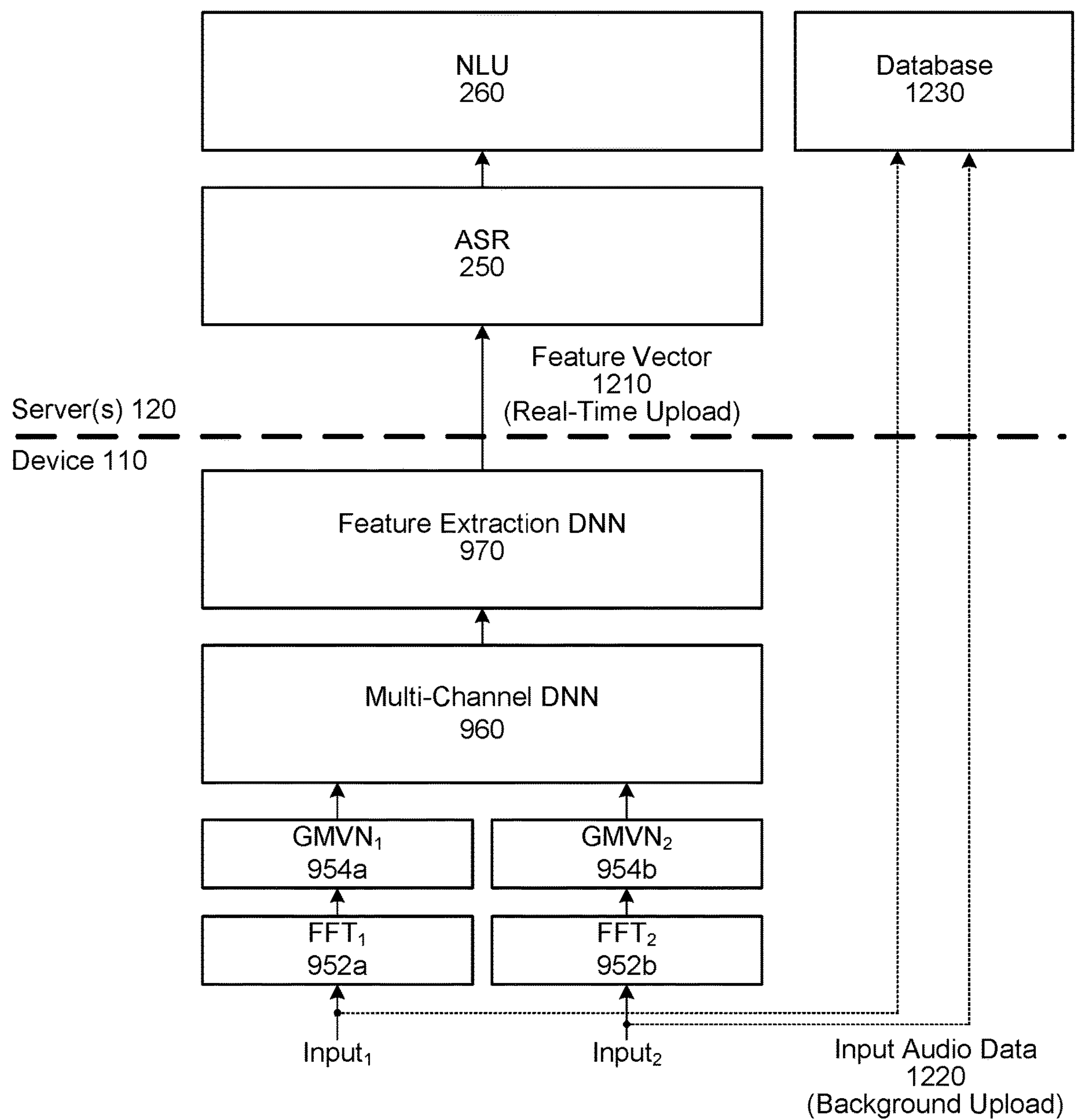
FIG. 12 is a conceptual diagram illustrating components for uploading feature vectors and audio data according to embodiments of the present disclosure.

FIG. 12 is a conceptual diagram illustrating components for uploading feature vectors and audio data according to embodiments of the present disclosure. As discussed above, the device 110 may include the multi-channel DNN 960 and the feature extraction DNN 970 and may upload a feature vector 1210 (e.g., the second feature vector generated by the feature extraction DNN 970) to the server(s) 120 for speech processing. The server(s) 120 may perform speech recognition using the Automatic Speech Recognition (ASR) component 250 using the feature vector 1210 and may perform natural language understanding (NLU) using the NLU component 260. The server(s) 120 may perform additional processing to identify a voice command, perform an action, and/or send an instruction to the device 110 to perform an action.

Whereas a conventional audio front-end uploads audio data (e.g., beamformed audio data) during real-time processing in order for the server(s) 120 to determine the voice command and/or determine the action to perform, the device 110 illustrated in FIG. 12 only needs to upload the feature vector 1210 during real-time processing. Thus, an amount of bandwidth required to perform speech processing is reduced during real-time processing. At a later point in time, when the device 110 is inactive and/or bandwidth is not an issue, the device 110 may upload the input audio data 1220 to the server(s) 120. For example, the device 110 may upload the input audio data 1220 to a database 1230 as a background upload, enabling the server(s) 120 to perform training or additional processing on the input audio data 1220 itself. Thus, the device 110 may send the feature vector 1210 to the server(s) 120 at a first time, may receive a voice command or an instruction to perform an action from the server(s) 120 at a second time, and may send the input audio data 1220 to the server(s) 120 at a third time. However, the disclosure is not limited thereto, and in some examples the device 110 may never upload the input audio data 1220 to the server(s) 120 without departing from the disclosure.

As illustrated in FIG. 12, the system 100 may upload the feature vector 1210 to a first component within the server(s) 120 (e.g., ASR component 250) and may upload the input audio data 1220 to a second component within the server(s) 120 (e.g., database 1230). Thus, in some examples the device 110 may upload the feature vector 1210 to a first server 120*a* and may upload the input audio data 1220 to a second server 120*b* that is separate from the first server 120*a* without departing from the disclosure. However, the disclosure is not limited thereto and the device 110 may upload the feature vector 1210 and the input audio data 1220 to a single server 120 without departing from the disclosure.

Additionally or alternatively, while FIG. 12 illustrates the device 110 uploading the input audio data 1220 at the third time after the first time, the disclosure is not limited thereto. Instead, the device 110 may upload (i) input audio data in a time domain (e.g., output of the microphone(s) 114 and/or after performing audio processing), (ii) input audio data in a frequency domain (e.g., output of the FFT 952 and/or normalized output of the GMVN 954), (iii) the feature vector 1210, or (iv) a combination thereof without departing from the disclosure. For example, the device 110 may upload the feature vector 1210 along with the input audio data 1220 to enable the server(s) 120 to compare the feature vector 1210 to another feature vector generated by the server(s) 120 using the input audio data 1220.

Figure 13:
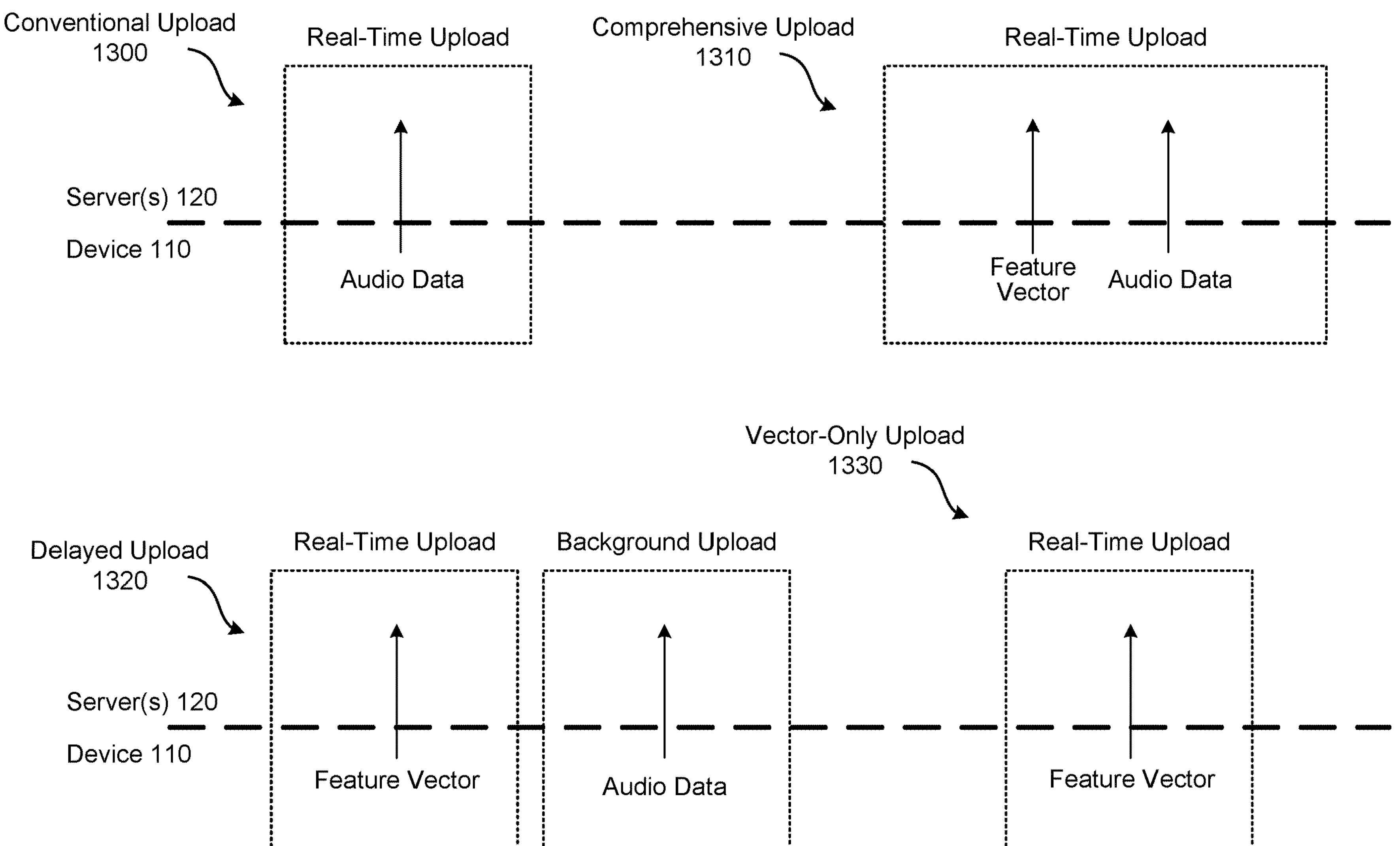
FIG. 13 illustrates examples of timing associated with uploading feature vectors and/or audio data according to embodiments of the present disclosure.

FIG. 13 illustrates examples of timing associated with uploading feature vectors and/or audio data according to embodiments of the present disclosure. As illustrated in FIG. 13, a conventional upload 1300 corresponds to the device 110 uploading audio data during real-time processing as a real-time upload. Thus, the device 110 uploads the audio data prior to the server(s) 120 performing speech processing.

In some examples, the device 110 may perform a comprehensive upload 1310, meaning that the device 110 uploads a feature vector and audio data during real-time processing as a real-time upload. However, the device 110 may instead perform a delayed upload 1320, meaning that the device 110 uploads the feature vector prior to the server(s) 120 performing speech processing and then uploads the audio data at a later point in time. Additionally or alternatively, the device 110 may perform a vector-only upload 1330, meaning that the device 110 only uploads the feature vector and does not upload audio data to the server(s) 120.

Figure 14:
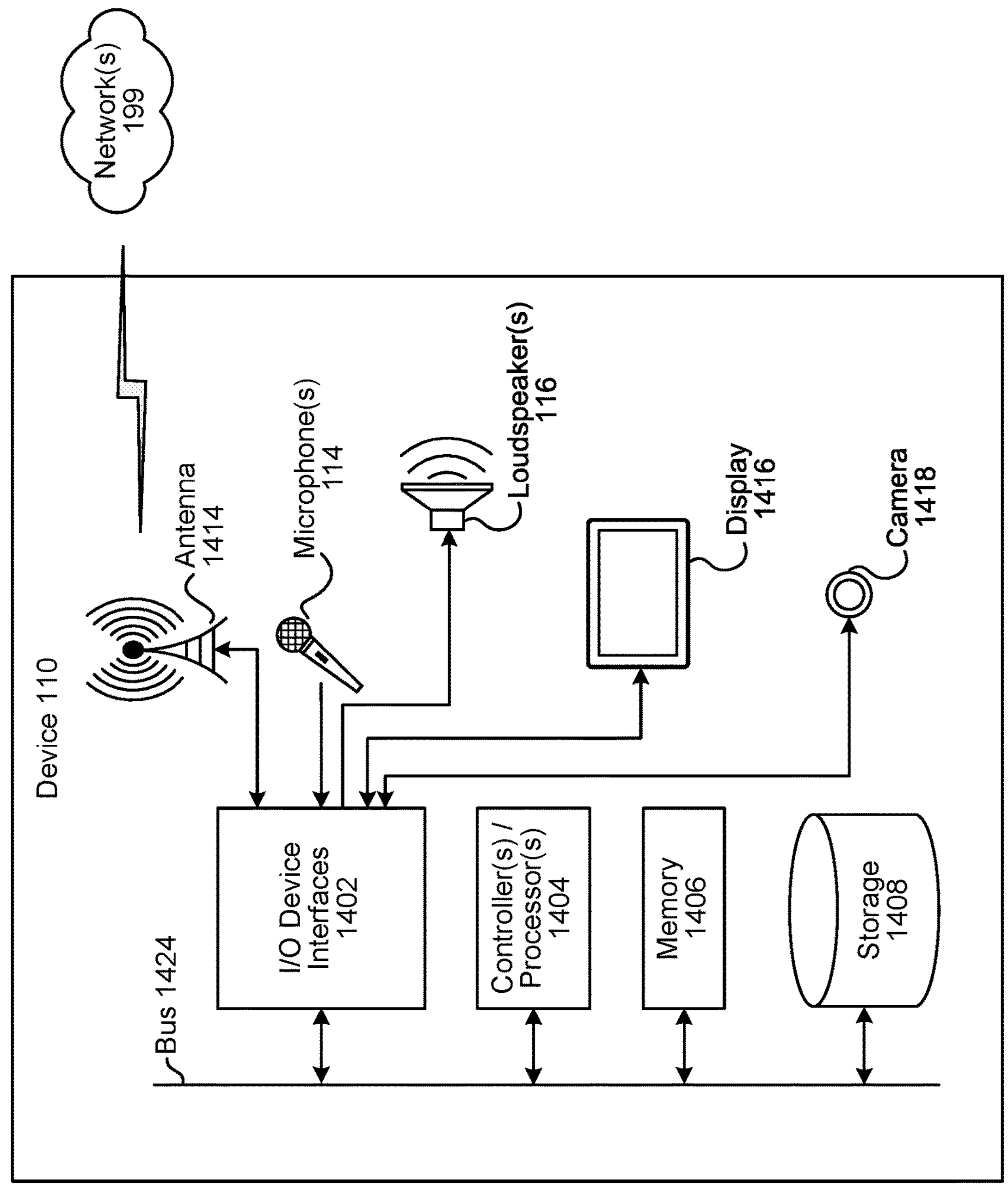
FIG. 14 is a block diagram conceptually illustrating example components of a device according to embodiments of the present disclosure.
Figure 15:
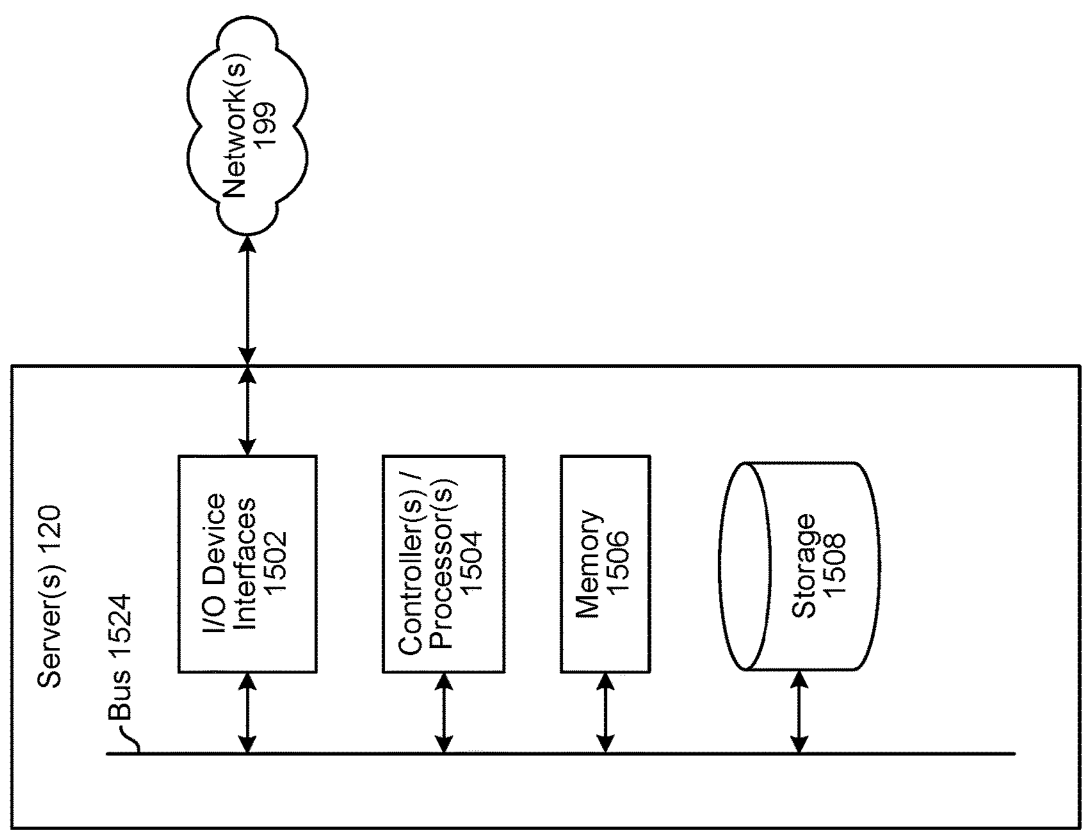
FIG. 15 is a block diagram conceptually illustrating example components of a server according to embodiments of the present disclosure.

FIG. 14 is a block diagram conceptually illustrating a device 110 that may be used with the system. FIG. 15 is a block diagram conceptually illustrating example components of a remote device, such as the server(s) 120, which may assist with ASR processing, NLU processing, etc. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers 120 may be included in the system, such as one or more servers 120 for performing ASR processing, one or more servers 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1402/1502).

Computer instructions for operating each device (110/120) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120) includes input/output device interfaces (1402/1502). A variety of components may be connected through the input/output device interfaces (1402/1502), as will be discussed further below. Additionally, each device (110/120) may include an address/data bus (1424/1524) for conveying data among components of the respective device. Each component within a device (110/120) may also be directly connected to other components in addition to (or instead of) being connected to other components across the bus (1424/1524).

Referring to FIG. 14, the device 110 may include input/output device interfaces 1402 that connect to a variety of components such as an audio output component such as a loudspeaker(s) 116, a wired headset or a wireless headset (not illustrated), or other component capable of outputting audio. The device 110 may also include an audio capture component. The audio capture component may be, for example, microphone(s) 114 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content. The device 110 may further include a camera 1418.

Via antenna(s) 1414, the input/output device interfaces 1402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (1402/1502), processor(s) (1404/1504), memory (1406/1506), and/or storage (1408/1508) of the device(s) 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are illustrative, and may be located as a stand-alone device or may be included, in whole or in part, as a component of a larger device or system.

Figure 16:
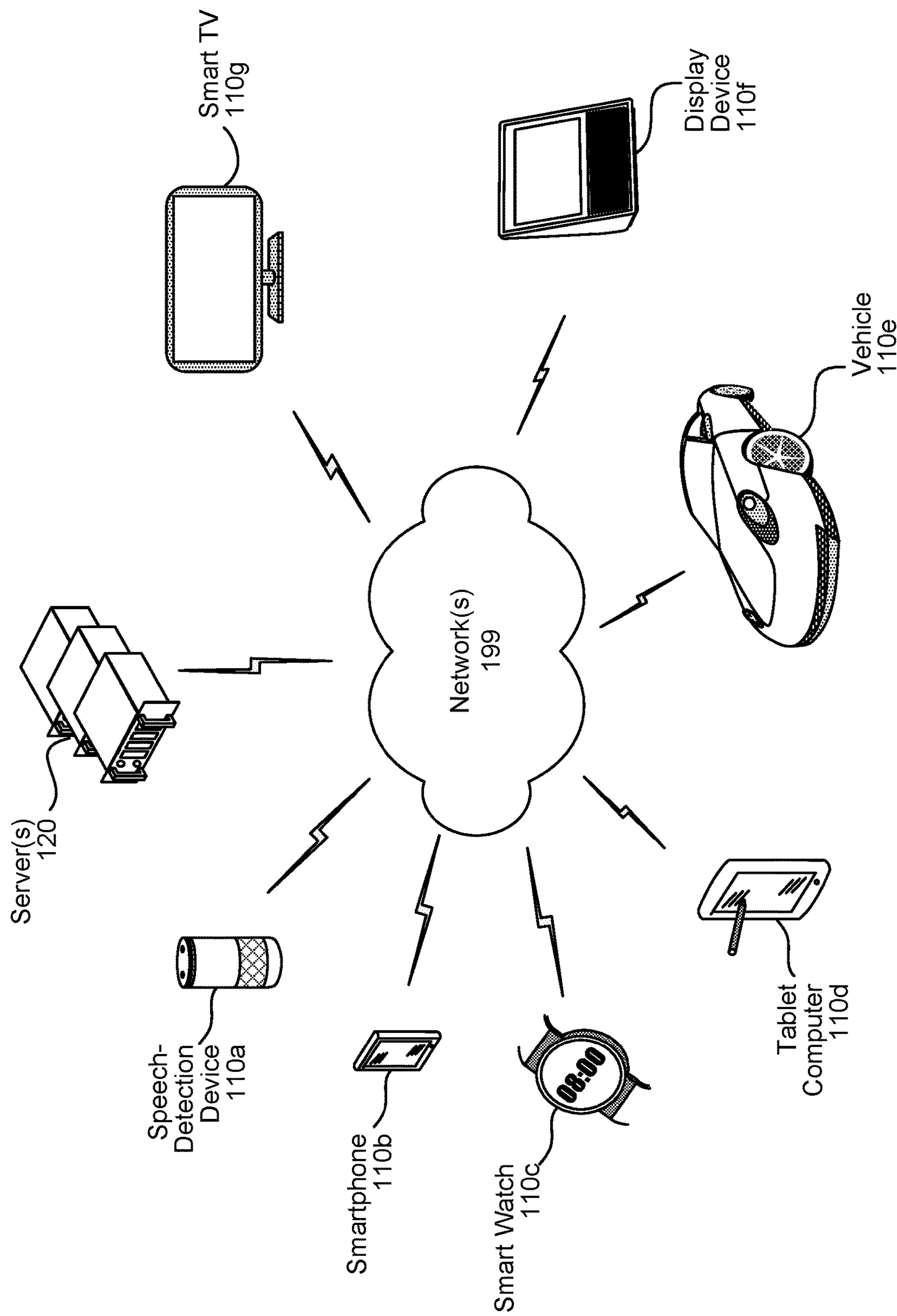
FIG. 16 illustrates an example of a computer network for use with the speech processing system.

As illustrated in FIG. 16, multiple devices (110*a*-110*g*, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a display device 110*f*, and/or smart television 110*g* may be connected to the network(s) 199 through a wireless service provider, over a WiFi or cellular network connection, via an adapter from a public switched telephone network (PSTN), and/or the like.

Other devices are included as network-connected support devices, such as the server(s) 120, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

receiving input audio data, the input audio data corresponding to at least a first microphone associated with a device and a second microphone associated with the device;

processing the input audio data using a first machine learning model to generate first data, a first portion of the first data generated based on a first power value associated with the input audio data and a second power value associated with the input audio data, wherein processing the input audio data further comprises:

processing a first portion of the input audio data using an affine transform to determine intermediate data, and processing the intermediate data to determine the first power value; and sending the first data to a further component for further processing.

2. The computer-implemented method of claim 1, wherein processing the input audio data further comprises:

determining the first power value using the first portion of the input audio data, the first portion of the input audio data corresponding to a first frequency range; and determining the second power value using a second portion of the input audio data corresponding to a second frequency range.

3. The computer-implemented method of claim 1, further comprising:

determining the first power value using a first channel of the input audio data corresponding to the first microphone; and determining the second power value using a second channel of the input audio data corresponding to the second microphone.

4. The computer-implemented method of claim 1, wherein the first machine learning model comprises:

a first layer corresponding to the affine transform; and a second layer corresponding to power calculation.

5. The computer-implemented method of claim 4, wherein the first machine learning model further comprises:

a third layer corresponding to a max-pooling operation.

6. The computer-implemented method of claim 1, further comprising:

processing the first data using at least one speech processing component to determine speech processing output data.

7. The computer-implemented method of claim 1, wherein sending the first data to the further component for further processing comprises sending the first data to at least one remote device operating software to perform speech processing.

8. The computer-implemented method of claim 1, further comprising:

after sending the first data, sending, to at least one remote device, second input audio data, wherein the second input audio data corresponds to at least a portion of the input audio data.

9. The computer-implemented method of claim 8, further comprising:

using the second input audio data to train a model.

10. The computer-implemented method of claim 1, further comprising:

processing the first data using a second machine learning model to generate second data, a first portion of the second data corresponding to a first frequency range, a second portion of the second data corresponding to a second frequency range; and sending the second data to one or more speech processing components.

11. A system comprising:

at least one processor; and memory including instructions operable to be executed by the at least one processor to cause the system to:

receive input audio data, the input audio data corresponding to at least a first microphone associated with a device and a second microphone associated with the device;

process the input audio data using a first machine learning model to generate first data, a first portion of the first data generated based on a first power value associated with the input audio data and a second power value associated with the input audio data, wherein the first machine learning model comprises:

a first layer corresponding to an affine transform, and a second layer corresponding to power calculation; and send the first second data to a further component for further processing.

12. The system of claim 11, wherein the memory further comprises instructions that, when executed by the at least one processor, further cause the system to:

determine the first portion of the first data based at least in part on a first frequency range of the input audio data; and determine a second portion of the first data based at least in part on a second frequency range of the input audio data.

13. The system of claim 11, wherein the memory further comprises instructions that, when executed by the at least one processor, further cause the system to:

determine the first portion of the first data based at least in part on a first portion of the input audio data corresponding to the first microphone; and determine a second portion of the first data based at least in part on a second portion of the input audio data corresponding to the second microphone.

14. The system of claim 11, wherein the first machine learning model further comprises:

a third layer corresponding to a max-pooling operation.

15. The system of claim 11, wherein the memory further comprises instructions that, when executed by the at least one processor, further cause the system to:

process the first data using at least one speech processing component to determine speech processing output data.

16. The system of claim 11, wherein the instructions that cause the system to send the first data to the further component comprise instructions that, when executed by the at least one processor, further cause the system to send the first data to at least one remote device operating software to perform speech processing.

17. The system of claim 11, wherein the memory further comprises instructions that, when executed by the at least one processor, further cause the system to:

after sending the first data, send, to at least one remote device, second input audio data, wherein the second input audio data corresponds to at least a portion of the input audio data.

18. The system of claim 11, wherein the memory further comprises instructions that, when executed by the at least one processor, further cause the system to:

process the first data using a second machine learning model to generate second data, a first portion of the second data corresponding to a first frequency range, a second portion of the second data corresponding to a second frequency range; and send the second data to one or more speech processing components.

19. A computer-implemented method, the method comprising:

receiving input audio data, the input audio data corresponding to at least a first microphone associated with a device and a second microphone associated with the device;

processing the input audio data using a first machine learning model to generate first data, a first portion of the first data generated based on a first power value associated with the input audio data and a second power value associated with the input audio data, wherein the first machine learning model comprises:

a first layer corresponding to an affine transform, and a second layer corresponding to power calculation; and sending the first data to a further component for further processing.

20. The computer-implemented method of claim 19, further comprising:

processing the first data using a second machine learning model to generate second data, a first portion of the second data corresponding to a first frequency range, a second portion of the second data corresponding to a second frequency range; and sending the second data to one or more speech processing components.

* * * * *